United States Patent
Sakakibara et al.

(10) Patent No.: US 8,410,756 B2
(45) Date of Patent: Apr. 2, 2013

(54) BATTERY PACK HAVING A SENSOR ACTIVATED OFF SWITCH

(75) Inventors: Kazuyuki Sakakibara, Okazaki (JP); Hiroshi Murata, Anjo (JP); Yutaka Matsunaga, Anjo (JP); Munetoshi Goto, Anjo (JP)

(73) Assignee: Makita Corporation, Anjo-Shi (JP)

( * ) Notice: Subject to any disclaimer, the term of this patent is extended or adjusted under 35 U.S.C. 154(b) by 287 days.

(21) Appl. No.: 12/805,887

(22) Filed: Aug. 23, 2010

(65) Prior Publication Data

US 2010/0320969 A1 Dec. 23, 2010

(30) Foreign Application Priority Data

Sep. 4, 2009 (JP) ................. 2009-204578

(51) Int. Cl.
*H02J 7/00* (2006.01)
(52) U.S. Cl. ................ 320/118; 320/107
(58) Field of Classification Search .............. 320/118
See application file for complete search history.

(56) References Cited

U.S. PATENT DOCUMENTS

| | | | |
|---|---|---|---|
| 4,399,201 A | | 8/1983 | Nagahara |
| 4,816,851 A * | | 3/1989 | Fukahori et al. ............. 396/406 |
| 5,401,592 A | | 3/1995 | Giplin et al. |
| 5,725,304 A | | 3/1998 | Inai |
| 5,739,596 A * | | 4/1998 | Takizawa et al. .............. 307/66 |
| 6,331,762 B1 * | | 12/2001 | Bertness ...................... 320/134 |
| 7,058,484 B1 * | | 6/2006 | Potega .......................... 700/297 |
| 7,592,773 B2 | | 9/2009 | Pellenc |
| 8,198,835 B2 * | | 6/2012 | Yokoyama et al. ........... 318/139 |
| 2003/0080880 A1 * | | 5/2003 | Kaino et al. ..................... 341/22 |
| 2004/0012374 A1 * | | 1/2004 | Kamenoff ..................... 320/135 |
| 2004/0135531 A1 * | | 7/2004 | Graham et al. ............... 318/442 |
| 2007/0108944 A1 | | 5/2007 | Pellenc |
| 2007/0188130 A1 * | | 8/2007 | Scheucher ................... 320/110 |
| 2008/0152993 A1 | | 6/2008 | Seiler et al. |
| 2009/0015206 A1 * | | 1/2009 | Seman et al. ................. 320/134 |
| 2009/0061269 A1 * | | 3/2009 | Muramatsu ..................... 429/23 |
| 2009/0284225 A1 * | | 11/2009 | Nakanuma et al. ........... 320/134 |
| 2010/0181966 A1 | | 7/2010 | Sakakibara |

FOREIGN PATENT DOCUMENTS

| | | |
|---|---|---|
| GB | 2 300 998 A | 11/1996 |
| JP | A-9-155769 | 6/1997 |
| JP | A-2000-308268 | 11/2000 |
| JP | A-2007-511380 | 5/2007 |
| JP | A-2007-311319 | 11/2007 |
| JP | A-2008-159590 | 7/2008 |
| JP | A-2009-71976 | 4/2009 |

OTHER PUBLICATIONS

British Search Report dated Oct. 19, 2010 in British Patent Application No. GB1013433.6.

* cited by examiner

*Primary Examiner* — Arun Williams
(74) *Attorney, Agent, or Firm* — Oliff & Berridge, PLC

(57) ABSTRACT

A battery pack is provided with a plurality of battery modules; a pack main body that removably receives the plurality of battery modules; a movable member that prohibits the plurality of battery modules from being attached to and removed from the pack main body at a first position; at least one sensor that detects whether the movable member is located at the first position or not; and a controller that performs at least one predetermined processing based on detection by the at least one sensor.

15 Claims, 20 Drawing Sheets

BATTERY PACK HAVING A SENSOR ACTIVATED OFF SWITCH

CROSS-REFERENCE TO A RELATED APPLICATION

This application claims priority to Japanese Patent Application No. 2009-204578 filed on Sep. 4, 2010, the contents of which are hereby incorporated by reference into the present application.

TECHNICAL FIELD

The present invention relates to a battery pack which supplies electric power to an electric device, and in particular relates to a battery pack used by an electric power tool. An "electric power tool" means any type of electric power tools including, but not limited to, electric drills, electric screw drivers, electric grinders, electric circular saws, electric chain saws, electric reciprocating saws, electric hedge trimmer, electric lawn mowers, electric brush cutters and electric blowers.

DESCRIPTION OF RELATED ART

A battery pack in which a plurality of battery modules is connected in series is disclosed in Japanese Application Publication No. 2008-159590. The battery pack has ten battery modules that are connected in series, and each battery module is equipped with ten lithium ion cells that are connected in series. Therefore, one hundred lithium ion cells are connected in series in this battery pack. Because a nominal voltage of one lithium ion cell is 3.6 volts, the nominal voltage of this battery pack is 360 volts, which is a high voltage.

SUMMARY

When a battery pack is used repeatedly, battery cells inside the battery pack degrade. When the battery cells degrade, they do not all degrade in a uniform manner. Instead, only some of the battery cells seriously degrade. When the plurality of battery cells are connected in series, a performance of the battery pack as a whole noticeably declines even though only some battery cells have degraded. In other words, even though only some of the battery cells have degraded, the battery pack is no longer able to function at a sufficient level.

In other words, even if the battery pack cannot be used, the performance of the battery pack can be restored if the degraded battery cells are replaced. Because of that, the battery pack is preferably constructed so that one or more of the battery cells can be selectively replaced. In particular, it is essential that a battery pack equipped with a large number of battery cells be constructed so that some of the battery cells installed therein can be selectively replaced, thus making it possible to prevent a large-scale disposal of still useable battery cells. However, as noted below, it is not easy for a user to replace degraded battery cells.

First, because there is the plurality of battery cells connected in series inside the battery pack, a relatively high voltage can be produced. When a battery cell is replaced in a state in which a high voltage has been generated, the battery pack may be damaged due to an electrical short circuit. Thus, it is thought that several circuit breakers should be placed between the plurality of battery cells connected in series. According to this construction, when the battery cells are to be replaced, the generation of a high voltage can be prevented by opening the circuit breakers. However, even if circuit breakers are provided, the battery pack may be damaged in an event that the user forgets to open the circuit breakers and replaces the battery cells.

Second, the user must specify the one or more of the battery cells to be replaced from amongst the plurality of battery cells. Here, technology for checking the state of degradation of the battery cells is commonly known, and a function that checks the state of degradation of the battery cells can also be provided in the battery pack. However, even if this check function is provided in the battery pack, the user may forget to use the check function, and thus still useable battery cells may be replaced in error.

Third, after replacing the battery cells, the user may need to perform a balance process in order to equalize the charge states of all battery cells. Normally, the charge states of newly replaced battery cells and pre-existing battery cells differ from each other. In addition, when the charge states of the plurality of battery cells are equalized, the performance (e.g., a charge capacity) of the entire battery pack dramatically declines, and some of the battery cells degrade quickly. Thus, after replacing the battery cells, it is necessary to selectively charge or discharge some of the battery cells, and equalize the charge states of all battery cells. Here, technology for performing the balance process on the plurality of battery cells is commonly known, and the function to perform the balance process on the battery cells can also be provided in the battery pack. However, even if this type of function is provided, the user may forget to use the function, and then reuse the battery pack with the battery cells in an unequalized state.

As noted above, there is a need to perform various processes and operations in association with the replacement of some of the battery cells in the battery pack by the user. In addition, if these processes and operations are not performed, problems such as a damage to the battery pack and an early degradation of the battery cells may arise, as well as a significantly shortened battery pack life. Thus, the battery pack not only needs to have a structure that allows some of the battery cells to be selectively replaced, but also surely perform processes that are necessary for the replacement of the battery cells.

An object of the present teachings is to provide technology for detecting a replacement of battery cells in a battery pack by a user, and automatically performing the necessary processes. Accordingly, a battery pack may be attained in which, for example, the electrical connections of the battery cells are automatically cut off when the user replaces the battery cells. Or, a battery pack is attained in which, for example, the degradation state of the battery cells is automatically checked when the user replaces the battery cells. Or, a battery pack is attained in which a balance process is automatically performed when the user replaces the battery cells. Another object of the present teachings is to attain a battery pack that automatically performs one or a plurality of necessary processes, and not limited to the processes illustrated above.

The battery pack according to the present teachings comprises a plurality of battery modules, and a pack main body in which the plurality of battery modules is removably installed. Each battery module is equipped with electrically connected battery cells. The pack main body is electrically connected to the plurality of battery modules installed therein, and outputs electric power from the battery modules to an electric equipment (such as an electric power tool).

In the aforementioned battery pack, a plurality of battery cells is distributed amongst the plurality of battery modules. Because the battery modules are removable from the pack main body, the user can replace one or a plurality of battery modules with new ones in accordance with need. For example, when some of the battery cells have degraded and the performance of the battery pack has declined, the performance of the battery pack can be restored by replacing the degraded battery cells in the battery modules. In this case, the other battery modules can continue to be used as they are.

The pack main body has a moveable member. The moveable member is capable of moving in a range that includes a first position. The moveable member prevents the battery modules from being attached to and removed from the pack main body when in the first position. Thus, the user must move the moveable member from the first position when a battery module is to be replaced. By moving the moveable member from the first position to the second position, the user will be permitted to attach and remove the battery modules with respect to the pack main body. The moveable member may be a member that is moveably supported by the pack main body, or may be a member that is removable from the pack main body. With the latter construction, the moveable member comes to be in the first position when attached to the pack main body, and comes to be in the second position when removed from the pack main body.

The shape of the moveable member is not particularly limited. For example, the moveable member may have a structure that engages with the plurality of battery modules installed in the pack main body when in the first position. Alternatively, the moveable member may have a structure that at least partially covers the plurality of battery modules installed in the pack main body when in the first position. With the latter structure, the user can avoid coming into contact with the plurality of battery modules installed in the pack main body.

Furthermore, the battery pack is provided with a sensor that detects whether or not the moveable member is in the first position, and a controller that performs predetermined processes based upon the detection result of the sensor. The sensor and controller can each be provided on at least one of the battery modules and the pack main body. The sensor may directly detect the presence of the moveable member in the first position, or may indirectly detect whether or not the moveable member is in the first position by detecting whether or not the moveable member is in the second position.

As previously explained, the moveable member must move from the first position when the user replaces a battery module. When the moveable member moves from the first position, which fact is detected by the sensor. In other words, the replacement of the battery module by the user is detected by the sensor. By monitoring the detection result of the sensor, the controller can detect the replacement of the battery module by the user, and perform the necessary processes at appropriate timings. The controller can employ a microcomputer, and can store in advance each process needed in the replacement of the battery cell.

According to the battery pack of the present teachings, one or more of the processes needed during the replacement of the battery module by the user are reliably performed. Thus, the user can correctly replace the battery module without performing complex processes or operations.

In one embodiment of the present teachings, the controller preferably performs a process that prohibits the plurality of battery modules in the electric tool from being discharged based upon the detection result of the sensor. Additionally or in the alternative, the controller preferably performs a process that prohibits the plurality of battery modules from being charged by an external power source based upon the detection result of the sensor. In particular, these processes are preferably performed when the detection result from the sensor indicate movement from the first position of the moveable member. Accordingly, when the user replaces a battery module, the flow of electricity to the battery modules can be prohibited, and damage to the battery modules and battery pack due to a short circuit can be prevented.

In another embodiment of the present teachings, the controller preferably performs a disconnection process that electrically disconnects the plurality of battery modules based upon the detection result of the sensor. In particular, this disconnection process is preferably performed when the detection result of the sensor indicates movement from the first position of the moveable member. By disconnecting the electrical connection between the plurality of battery modules, the battery modules are prohibited from being charged and discharged, and a high voltage is prevented from being generated inside the battery pack. Accordingly, the damage to the battery modules and the battery pack when the battery modules are replaced by the user can be prevented.

In another embodiment of the present teachings, the controller preferably performs a check process that checks the degradation state of the battery cells installed in each battery module based upon the detection result of the sensor. In particular, this check process is preferably performed when the detection result of the sensor indicates movement of the moveable member to the first position. Consequently, the user can correctly specify the battery modules to be replaced upon replacing the battery modules.

In another embodiment of the present teachings, the controller preferably selectively discharges some of the plurality of battery modules and performs a balance process that equalizes the charge states of the plurality of battery modules based upon the detection state of the sensor. Note that the balance process must be performed after the user has completed the replacement of the battery module. Accordingly, the controller preferably has a memory that stores at least a portion of the detection result of the sensor, and performs the balance process based upon information stored in the memory e.g. when the charge process of the battery pack is performed. After the balance process is performed, all of the battery modules can be uniformly and fully charged by performing the battery pack charge process (i.e., the plurality of battery modules).

The battery pack according to the present teachings can detect the replacement of the battery module (i.e., battery cells) by the user, and can automatically perform the necessary processes. Accordingly, the damage to the battery modules and battery pack when the battery module (i.e., some of the battery cells) is replaced by the user can be prevented.

DETAILED DESCRIPTION OF THE INVENTION

Figure 1:
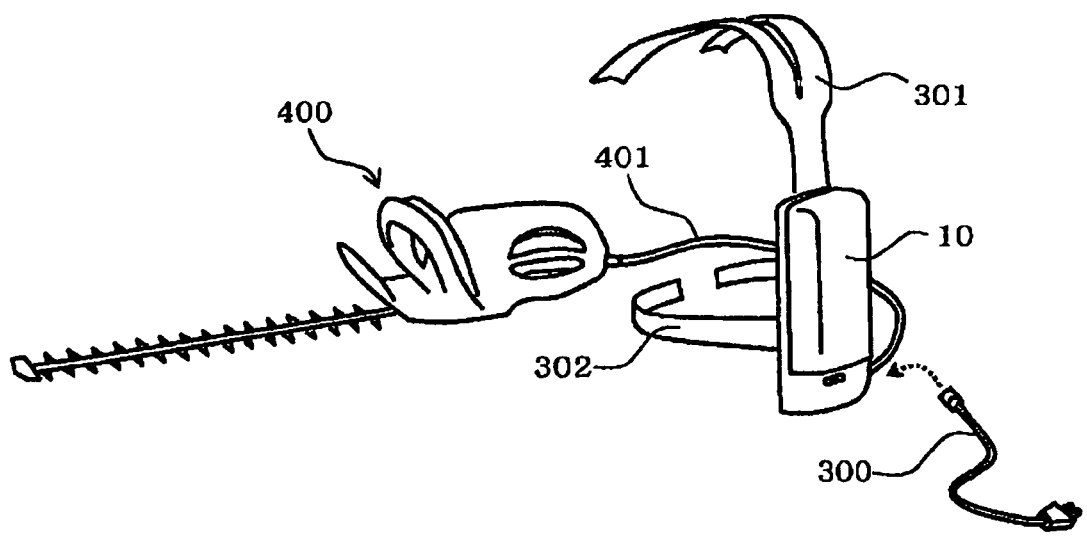
FIG. 1 shows an external view of a battery pack of Embodiment 1 and an electric power tool system that employs the same.

In another embodiment of the present teachings, each of the battery modules preferably has a switching circuit for disconnecting an electrical connection between installed battery cells and a pack main body. In addition, a controller preferably turns off the switching circuit when the detection result of a sensor indicates movement of a moveable member from a first position. According to this construction, the battery pack can automatically prohibit discharge of the battery modules when the user is replacing the battery module.

In another embodiment of the present teachings, the controller preferably turns on the switching circuits of the battery modules after the detection result of the sensor indicates movement of the movable member to the first position. However, the controller preferably continues to turn the switching circuit off for a predetermined delay time after the detection result of the sensor indicates movement of the movable member to the first position. The replacement of the battery module by the user is complete at the point at which the moveable member has moved to the first position. However, the user may often notice a problem with the installation of the battery module immediately after moving the moveable member to the first position, and thus may reinstall the battery module. Because of that, it is effective to electrically disconnect the plurality of battery modules for the predetermined delay time after the moveable member has moved to the first position.

In another embodiment of the present teachings, each battery module is preferably provided with a detector configured to detect the voltage and/or current of at least one installed battery cell, and a discharge circuit configured to be electrically connected to the battery cells for discharging the battery cells in accordance with an instruction from the controller. In addition, the controller preferably uses the detector and the discharge circuit provided in each battery module to perform the check process. In this embodiment in which the battery module has the detector and the discharge circuit, the installed battery cells can be discharged, and the voltage and current can be detected, even when the battery module is electrically disconnected from the pack main body. Then, the degradation state of the battery cells of the battery module can be checked based upon the detected voltage and current.

In the aforementioned embodiment, the controller preferably employs the detectors and the discharge circuits of the battery modules in performing a balance process.

In another embodiment of the present teachings, the controller preferably has a memory unit. In addition, the controller preferably stores a first detection flag in the memory unit when the detection result of the sensor indicate movement of the movable member from the first position, performs the balance process at a predetermined timing when the first detection flag is stored in the memory unit, and erases the first detection flag stored in the memory unit when the balance process is performed. Here, the timing at which the balance process is performed can be defined as when the moveable member has moved to the first position, when a predetermined time period has elapsed after the moveable member has moved to the first position, when the battery pack charge process has begun, or the like. In addition, the erasure of the first detection flag may occur when the balance process has begun, or when the balance process is complete. For example, if the balance process is interrupted for some reason, it is preferable that the first detection flag be erased when the balance process is complete. With this construction, when the balance process is unexpectedly interrupted, the first detection flag will not be erased, and the balance process will be automatically re-performed at the next opportunity.

In another embodiment of the present teachings, the battery pack has an openable cover disposed on the pack main body. The openable cover at least partially covers the plurality of battery modules when closed, and prohibits an attachment and removal of the plurality of battery modules with respect to the pack main body. This openable cover corresponds to the aforementioned moveable member, and the opening and closing of the openable cover is detected by the aforementioned sensor. The openable cover may be removable from the pack main body, and may be supported by the pack main body so that it can be opened and closed.

In another embodiment of the present teachings, each battery module has a plurality of battery cells connected in series.

In another embodiment of the present teachings, a battery module has a plurality of battery cells connected in series, a module case that houses the plurality of battery cells, a module side connector provided on the module case, and module side power terminals arranged on the module side connector. The module side power terminals are electrically connected to the plurality of battery cells.

In another embodiment of the present teachings, the pack main body has a housing. A module containing portion that contains the plurality of battery modules is formed in the housing. A plurality of main body side connectors are provided in the module containing portion. The plurality of main body side connectors can connect with the module side connectors on the plurality of battery modules contained therein. Main body side power terminals are provided on each main body side connector. Each of the main body side power terminals can electrically connect with the module side power terminals that are connected to the main body side connectors. The plurality of main body side power terminals respectively provided on the plurality of main body side connectors are connected in series to the output terminals on the pack main body. According to the above, the output from the plurality of the battery modules that is connected in series is output from the output terminals to the electric power tool.

In another embodiment of the present invention, the pack main body has a module cover. The module cover is an example of the openable cover described above. The module cover is removable from the housing. When the module cover is installed on the housing, the module cover closes the module containing portion, and covers the battery modules installed in the module containing portion. Accordingly, the attachment and removal of the battery modules with respect to the module containing portion is prohibited. When the module cover is removed from the housing, the module cover opens the module container portion, and permit the attachment and removal of battery modules with respect to the module containing portion. Note that the module cover may be constructed such that it is not removable from the housing, and such that the module containing portion is closed and opened by pivoting, rotating, deforming, or sliding the module cover with respect to the housing.

In another embodiment of the present teachings, the module cover can cover the entire module containing portion. In this configuration, all battery modules installed in the pack main body are completely covered by the housing of the pack main body and the module cover when the module cover is in the closed state. According to this construction, the user is prevented from mistakenly touching the battery modules, and the intrusion of foreign matter in the module containing portion is also prevented.

In another embodiment of the present invention, each battery module has a module controller, and the pack main body has a main controller. Each module controller and the main controller can communicate with each other, and the controller that performs overall control of the battery pack is constructed from the module controllers and the main controller.

In another embodiment of the present teachings, a display portion is provided on each battery module that displays the result of degradation state check performed by the controller. In this case, the module cover is preferably formed from at least a partially transparent (or translucent) material, and the user can preferably observe the display portion when the module cover is in the closed state.

In another embodiment of the present teachings, the pack main body comprises an outlet socket provided on an outlet terminal, a charge socket provided on a charge terminal, a socket cover that can be opened and closed with respect to the outlet socket and the charge socket, and a socket cover sensor that detects the opening and closing of the socket cover. The outlet terminal is electrically connected to the plurality of battery modules, and outputs electrical power discharged from the plurality of battery modules to the electric power tool. The charge terminal is electrically connected to the plurality of battery modules, and inputs electric power from an external power source to the plurality of battery modules. The socket cover prohibits the insertion of cords into the outlet socket and the charge socket when closed, and permits the insertion and removal of cords with respect to the outlet socket and the charge socket when opened. The controller performs predetermined processes based upon the detection result of the socket cover sensor. For example, the controller performs a process that prohibits discharge from the plurality of battery modules, and/or charging of the plurality of battery modules, when the detection result of the socket cover sensor indicates that the socket cover is open. In addition, the controller performs a process that electrically disconnects the plurality of battery modules installed in the pack main body when the detection result of the socket cover sensor indicates that the socket cover is open.

(Embodiment 1)

A battery pack 10 of Embodiment 1 will be described with reference to the drawings. As shown in FIG. 1, the battery pack 10 is connected to an electric power tool 400 by a power supply cord 401, and supplies electric power to the electric power 400 as being a power source therefor. The power supply cord 401 is removable from the battery pack 10. When using the electric power tool 400, the electric power cord supply 301 is installed onto the battery pack 10, and when the electric power tool is not used, the power supply cord 401 is removed from the battery pack 10. As described below, the battery pack 10 is comprised of 30 battery cells connected in series, and has a nominal voltage of 108 volts.

Note that in FIG. 1, an electric hedge trimmer is illustrated as an example of the electric power tool 400, but the electric power tool 400 to which electric power is supplied by the battery pack 10 is not limited to a hedge trimmer. The battery pack 10 can be used as a power source for supplying electric power to various electric power tools, such as an electric drill, an electric screwdriver, an electric grinder, an electric circular saw, an electric chainsaw, an electric reciprocal saw, an electric lawn mower, an electric brush trimmer, and the like.

As shown in FIG. 1, shoulder belts 301 and a waist belt 302 are provided on the battery pack 10. The shoulder belts 301 and the waist belt 302 are a harness that fixes the battery pack 10 to the back of the user. The shoulder belts 301 and the waist belt 302 are removable from the battery pack 10. When the user is to use the electric power tool 400, he or she can place the battery pack 10 on his or her back by using the shoulder straps 301 and the shoulder belt 302. By placing the relatively heavy battery pack 10 on his or her back, the user can easily handle the electric power tool 400 independently from the battery pack 10.

In addition, a charge cord 300 is provided on the battery pack 10. The charge cord 300 is removable from the battery pack 10. Although more details will be provided below, the battery pack 10 is equipped with a charge circuit. The battery pack 10 can charge the plurality of battery cells 101 (described below) by connecting it to a commercial power supply (AC power supply) via the charge cord 300.

Figure 2:
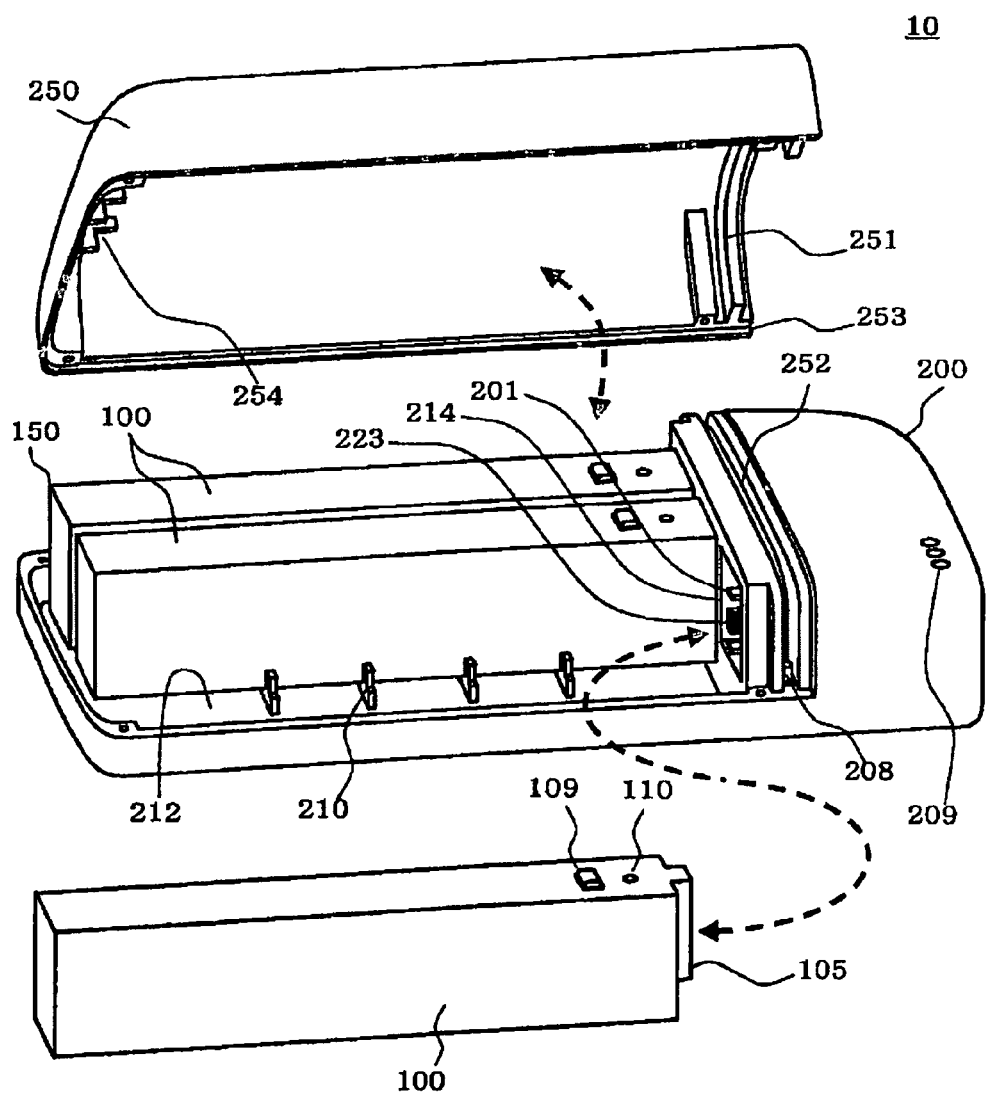
FIG. 2 shows an external view of the battery pack.

FIG. 2 shows an external view of the battery pack 10. As shown in FIG. 2, the battery pack 10 comprises a pack main body 200 and three battery modules 100. Each battery module 100 is removable from the pack main body 200. Each battery module 100 contains a plurality of battery cells 101 connected in series (see FIGS. 3 and 4). As described below, thirty battery cells 101 are divided amongst the three battery modules 100 and housed in the battery pack 10 of the present embodiment. Each battery module 100 is provided with a module side connector 105 for connecting to the pack main body 200, a check switch 109 for checking the degradation state of the battery cells 101, and a display light 110 for displaying the check result and the charge state of the battery cell 101.

The pack main body 200 is provided with a module containing portion 212 for containing the three battery modules 100. The module containing portion 212 is provided with three main body side connectors 214. Each main body side connector 214 can be connected to the module side connectors 105 on the battery modules 100. Each main body side connector 214 is provided with a pair of main body side power terminals 201, and a main body side communication terminal 223. In addition, a plurality of ribs 210 for positioning the battery modules 100 is formed in the module containing portion 212.

A module cover 205 is provided on the pack main body 200. The module cover 250 is an openable cover for closing the module containing portion 212. The module cover 250 is removable from the pack main body 200. The module cover 250 can be moved between a closed position in which the module containing portion 212 is closed, and an open position in which the module containing portion 212 is open, by attaching or removing it with respect to the pack main body 200. In other words, when the module cover 250 is removed from the pack main body 200, the module containing portion 212 will be open, and when the module cover 250 is attached to the pack main body 200, the module containing portion 212 will be closed.

When the module cover 250 is in the closed position (i.e., when the module cover 250 is attached to the pack main body 200), the battery modules 100 contained in the module containing portion 212 are covered by the module cover 250. Thus, when in the closed position, the module cover 250 prohibits the battery modules 100 from being attached to or removed from the module containing portion 212. In contrast, when the module cover 250 is in the open position (when the module cover 250 is removed from the pack main body 200), the attachment and removal of the battery modules 100 with respect to the module containing portion 212 are permitted.

Here, the shape of the module cover 250 is not limited to the shape shown in FIG. 2. For example, the module cover 250 may not be removable from the pack main body, and instead be made pivotably or slidably supported by the pack main body 200. Regardless of whether it is removable from the pack main body 200 or not removable therefrom, the module cover 250 may have a structure that is moveable between a closed position that at least partially closes the module containing portion 212 and prohibits the attachment and removal of the battery modules 100, and an open position that opens the module containing portion and permits the attachment and removal of the battery modules 100. In addition, the module cover 250 may be divided into a plurality of parts corresponding to each battery module 100. Furthermore, the module cover 250 may entirely cover the module containing portion 212, or may partially cover the module containing portion 212.

As one example, the shape of the module cover 250 of the present embodiment will be described in detail. An overlap portion 253 that fits on the pack main body 200 is provided on the module cover 250. Due to this, the module containing portion 212 is closed without any open gaps. Thus, occurrences such as the user mistakenly coming into contact with the battery modules 100, and foreign matter (such as dust and water) intruding into the module containing portion 212, are prevented.

In addition, an engagement rib 251 is formed on the module cover 250. The engagement rib 251 engages with an engagement groove 252 formed in the pack main body 200, and prevents the module cover 250 from slipping out of position. Furthermore, support ribs 254 that come into contact with the tail end 150 of the battery modules 100 (the end portions positioned on the opposite sides of the module side connectors 105) are provided on the inner surface of the module cover 250. Due to these support ribs 254, the battery modules 100 are prevented from coming off of the main body side connectors 214. Note that an elastic member that urges the battery modules 100 toward the main body side connectors 214 may be provided in the positions of the support ribs 254.

The module cover 250 is formed from a synthetic resin material that has an insulating property. In particular, the module cover 250 of the present embodiment is formed from a transparent synthetic resin. With the module cover 250 being formed from a transparent material, the display lights 110 of the battery modules 100 contained in the module containing portion 212 can be observed from the outside by the user without opening the module cover 250. Note that the module cover 250 may alternatively be formed from a translucent material. In addition, the module cover 250 need not be entirely transparent or translucent, but may instead only be transparent or translucent on a portion thereof.

The pack main body 200 has a module cover sensor 208 for detecting the opening and closing of the module cover 250. The module cover sensor 208 is constructed to employ one type of switch, and turns on and off in response to whether or not the module cover 250 is in the closed position. In other words, when the module cover 250 is attached to the pack main body 200 and the module cover 250 is in the closed position, the module cover sensor 208 is turned on. In contrast, when the module cover 250 is removed from the pack main body 200 and the module cover 250 is in the open position, the module cover sensor 208 is turned off.

As shown in FIG. 2, the module cover 250 is arranged in the interior of the engagement groove 252 of the pack main body 200. Accordingly, erroneous operations by the module cover sensor 208 due to contact with foreign matter are prevented, and the module cover sensor 208 turns on only when the module cover 250 is correctly attached. Here, the module cover sensor 208 need not necessarily be provided on the pack main body, and can instead be provided on at least one of the battery modules 100.

Three display lights 209 are provided on the pack main body 200. The three display lights 209 can display information such as the overall remaining charge of the battery modules 100 or the need to replace a battery module 100. Each display light 209 is constructed to use a light emitting diode.

Figure 3:
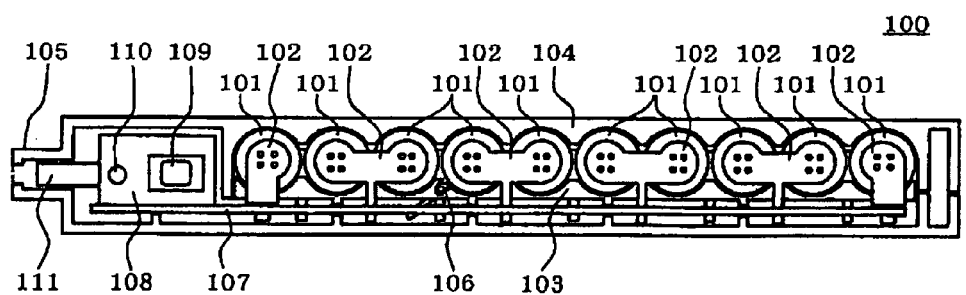
FIG. 3 is an upper view showing the internal structure of a battery module.
Figure 4:
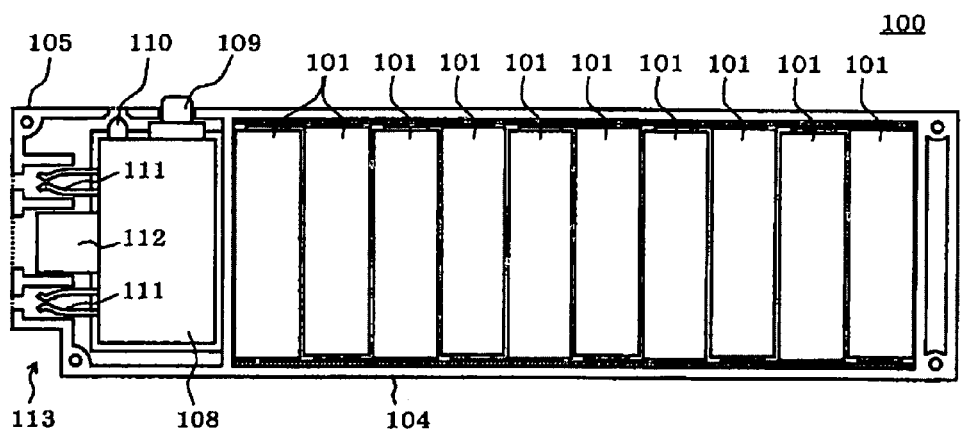
FIG. 4 is a side view showing the internal structure of the battery module.

Next, the construction of the battery module 100 will be described in detail. As shown in FIGS. 3 and 4, a battery module 100 comprises a module case 104. The module case 104 is formed from a synthetic resin material having an insulating property. The aforementioned module side connector 105 is formed to be integral with the module case 104.

As shown in FIG. 4, the module side connector 105 is offset upward, and not positioned in the center of the module case 104 in the vertical direction. As a result, a notch portion 113 is formed only below the module side connector 105. The module case 104 has a vertically asymmetrical shape, and thus the battery module 100 is prohibited from being incorrectly attached to the pack main body 200.

The module case 104 contains ten battery cells 101 (hereinafter collectively referred to as battery cells 101). The battery cells 101 are held in place by a cell holder 103, and are parallel with each other and aligned in a single plane. The battery cells 101 are lined up in alternating directions, and the cathode of each battery cell 101 is adjacent to the anode of the adjacent battery cells 101. The battery cells 101 are connected in series by a plurality of lead plates 102.

Each battery cell 101 is a lithium ion battery cell. Generally speaking, the nominal voltage of a lithium ion battery cell is 3.6 volts. Thus, the nominal voltage of a battery module 100 is 36 volts. In addition, the maximum voltage that can be output by a lithium ion battery cell is 4.2 volts. Thus, the maximum voltage that can be generated by a battery module 100 is 42 volts. Here, when the voltage exceeds 42 volts, there is a significant danger of electric shock to a person. Because of that, the number of battery cells 101 contained in each battery module 100 may be planned such that the maximum voltage that can be generated is 42 volts or less, without being limited to lithium ion battery cells.

The module case 104 also contains a temperature sensor 106, a substrate 107, and module circuit unit 108. The temperature sensor 106 is arranged near a battery cell 101, and detects the temperature of the battery cell 101.

The module circuit unit 108 is provided with a pair of module side power terminals 111, a module side communication terminal 112, a check switch 109, and a display light 110. The pair of module side power terminals 111 and the module side communication terminal 112 are arranged in the interior of the module side connector 105. When the module side connector 105 is connected to the main body side connector 214 of the pack main body 200, the pair of module side power terminals 111 is connected to the pair of main body side power terminals 201, and the module side communication terminal 112 is connected to the main body side communication terminal 223.

The temperature sensor 106 and all lead plates 102 are electrically connected to the module circuit unit 108 via the substrate 107. The module circuit unit 108 and the substrate 107 have a microcomputer and various circuit elements, and form an internal circuit of the battery module 100 shown in FIG. 5.

Figure 5:
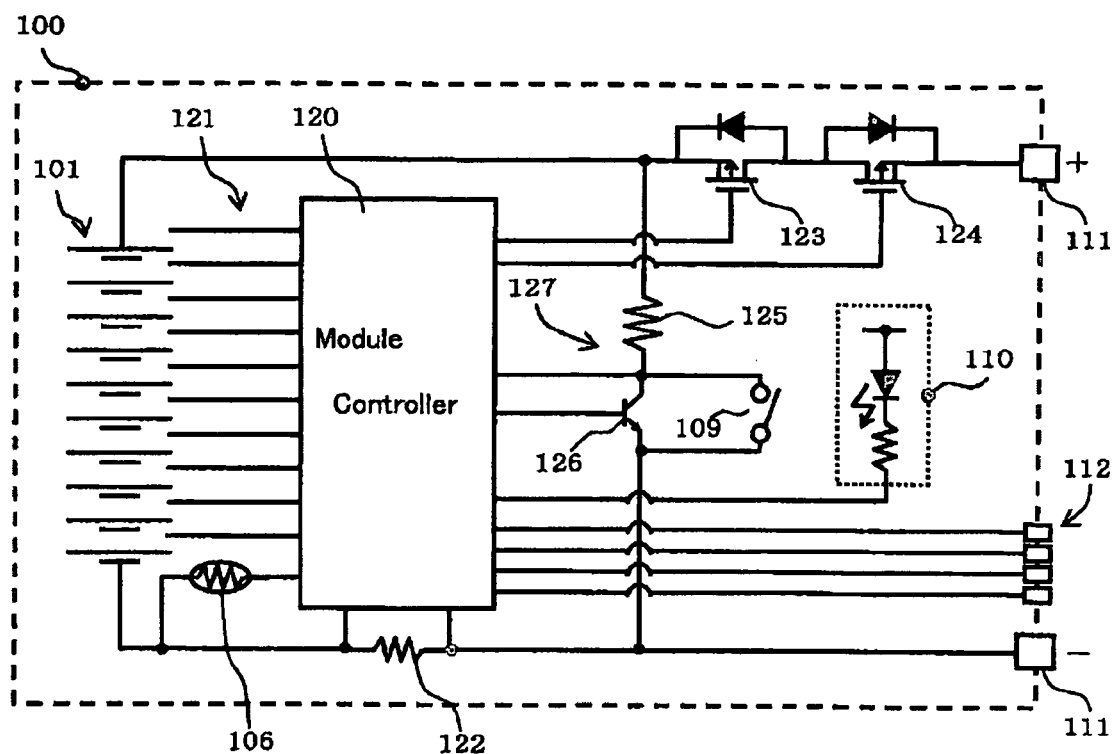
FIG. 5 is a schematic diagram showing the internal circuits of the battery module.

As shown in FIG. 5, the internal circuit of the battery module 100 comprises a module controller 120, a voltage detector 121, a shunt resistor 122, a discharge FET (field effect transistor) 123, a charge FET 124, and a discharge circuit 127. The discharge circuit 127 comprises an energy-consuming element 125 and a transistor 126. The module controller 120 is constructed with a microcomputer, and stores programs that performs various processes.

The pair of module side power terminals 111 is connected to the battery cells 101. In this configuration, the pair of module side power terminals 111 outputs discharge electric power from the battery cells 101 to the pack main body 200, and input charge electric power from the pack main body 200 to the battery cells 101.

The discharge FET 123 and the charge FET 124 are provided on wiring that connects the positive electrode of the battery cells 101 and the module side power terminals 111. The discharge FET 123 and the charge FET 124 are connected to the module controller 120, and the operation of the discharge FET 123 and the charge FET 124 is controlled by the module controller 120. The module controller 120 can electrically connect the battery cells 101 and the module side power terminals 111, and can disconnect this connection, by selectively turning the discharge FET 123 and the charge FET 124 on and off. When the discharge FET 123 is turned off, the discharge electric power from the battery cells 101 is prohibited from being supplied to the pack main body 200, and when the charge FET 124 is turned off, the charge electric power from the pack main body 200 is prohibited from being supplied to the battery cells 101.

The voltage detector 121 is a circuit for detecting the voltage of the battery cells 101, and inputs the potential of the positive electrode of each battery cell 101 into the module controller 120. The module controller 120 can detect the voltage of each battery cell 101 and the voltage of all battery cells 101 based on the voltage input from the voltage detector 121. Here, a portion of the voltage detector 121 is formed by the plurality of lead plates 102 that connects with the battery cells 101 and the substrate 107 that connects with the plurality of lead plates 102.

The shunt resistor 122 is a resistor element that is arranged in series with the battery cells 101, and forms a circuit that detects the current from the battery cells 101. The same current as flows through the battery cells 101 flows to the shunt resistor 122, and generates a voltage in response to the current flowing through the battery cells 101. The module controller 120 inputs the voltage generated by the shunt resistor 122, and detects the current of the battery cells 101.

The discharge circuit 127 is provided with the energy-consuming element 125 that is connected in series with the transistor 126, and is connected to the battery cells 101 via the shunt resistor 122. The energy-consuming element 125 is a resistor element. The transistor 126 is connected to the module controller 120, and that operation is controlled by the module controller 120. When the module controller 120 turns the transistor 126 on, the discharge circuit 127 is electrically connected to the battery cells 101. In this configuration, the battery cells 101 are discharged by the energy-consuming element 125. When a self-check process or a balance discharge process is performed as described below, the module controller 120 can cause the battery cells 101 inside the battery modules 100 to discharge by turning the transistor 126 on.

The check switch 109, the display light 110 and the module side communication element 112 are connected to the module controller 120. When the user operates the check switch 109, the module controller 120 performs a self-check process. The self-check process is performed regardless of whether the battery module 100 is attached to the pack main body 200 or the battery module 100 is removed from the pack main body 200. Then, the module controller 120 displays the check result obtained by the self-check process using the display light 110.

Figure 6:
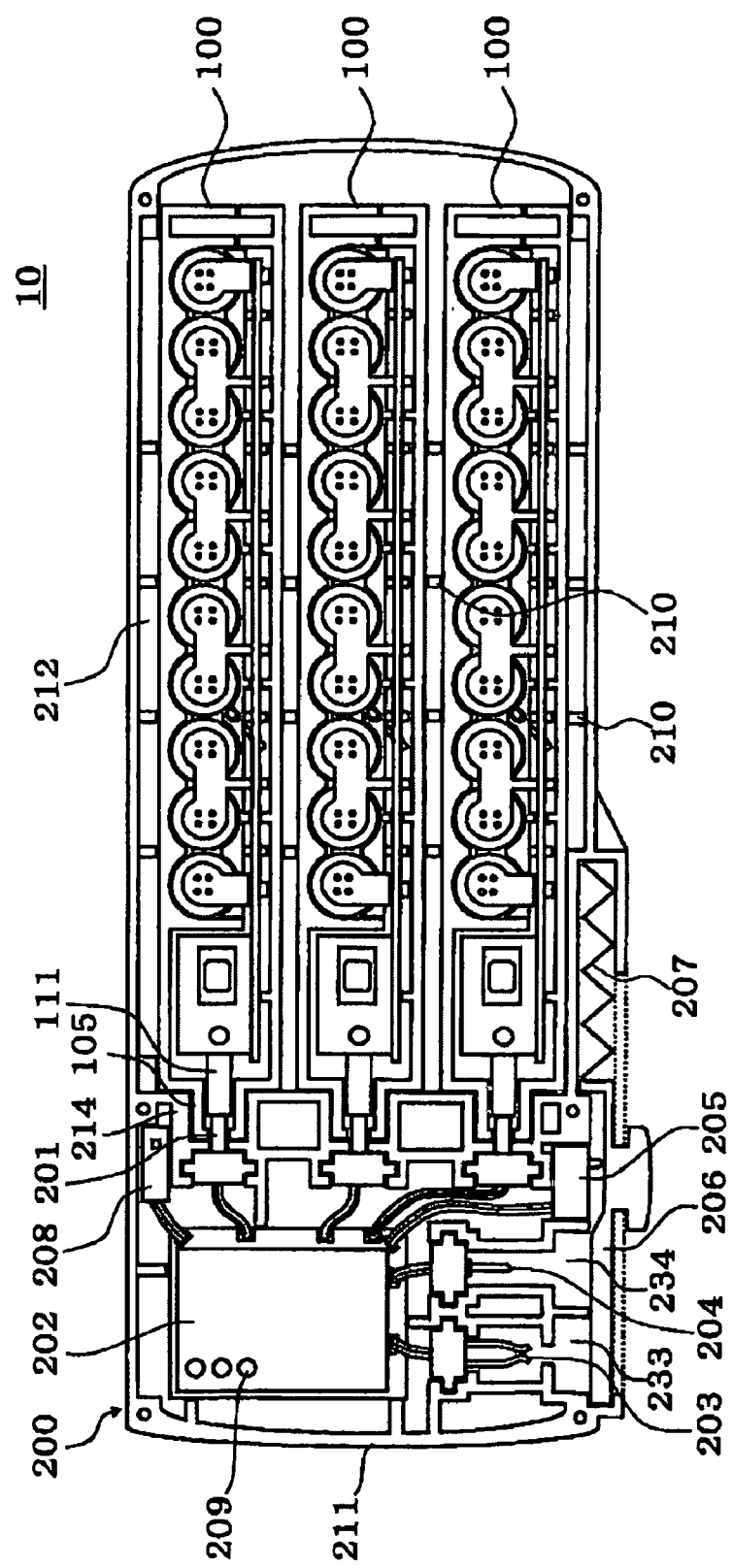
FIG. 6 is an upper view showing the internal structure of the battery pack including the battery modules.

Next, the overall construction of the battery pack 10 will be described in detail. As shown in FIG. 6, the pack main body 200 is comprised of a housing 211. The housing 211 is formed from a synthetic resin material having an insulating property. The aforementioned module containing portion 212, the main body side connector 214, and the ribs 210 are formed integrally with the housing 211. The module containing portion 212 contains three battery modules 100, and these battery modules 100 are supported by the ribs 210. The ribs form gaps in between the adjacent battery modules so as to prevent the battery modules 100 from overheating. The module side connector 105 on each battery module 100 is connected to the main body side connector 214 formed on the housing 210.

An outlet socket 233 and a charge socket 234 are also formed on the housing 211. The outlet socket 233 can be attached to and detached from the power supply cord 401. A pair of outlet terminals 203 that electrically connects to the power supply cord 401 is provided in the interior of the outlet socket 233. The charge socket 234 can be attached to and detached from the charge cord 300. A pair of charge terminals 204 that electrically connects to the charge cord 300 are provided in the interior of the charge socket 234.

Furthermore, a socket cover 206, a socket cover sensor 205, and a spring 207 are provided on the housing 211. The socket cover 206 is a cover that covers the outlet socket 233 and the charge socket 234. The socket cover 206 is slidably supported, and can move between a closed position which closes the outlet socket 233 and the charge socket 234, and an open position that opens the outlet socket 233 and the charge socket 234. The socket cover 206 is urged toward the open position by the spring 207. The socket cover sensor 205 is a switch that turns on and off in response to the position of the socket cover 206, and can detect the opening and closing of the socket cover sensor 205.

Figure 7A:
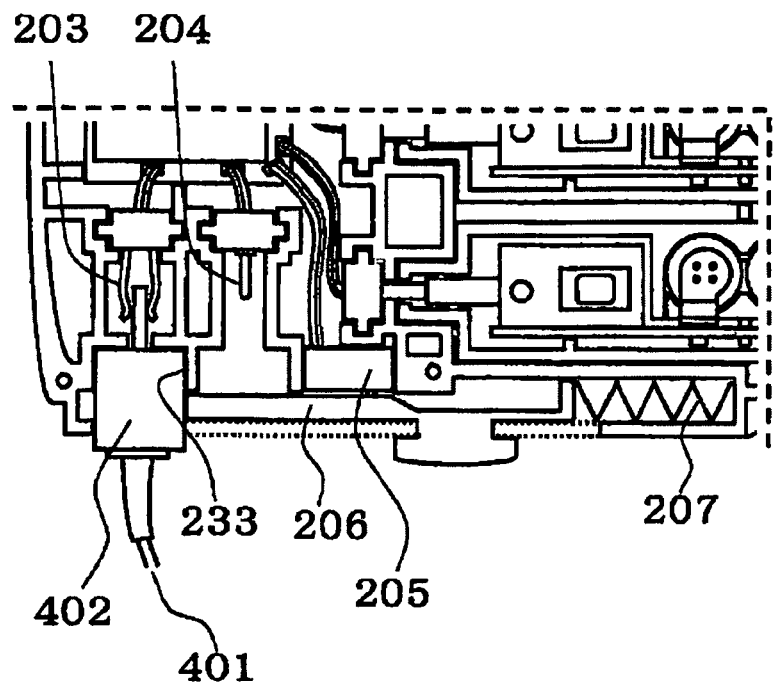
FIG. 7A shows a state in which a power supply cord is connected to an output socket.

FIG. 7A shows a state in which the power supply cord 401 is attached to the outlet socket 233. As shown in FIG. 7A, a plug 402 having a shape corresponding to the outlet socket 233 is provided on the end of the power supply cord 401. When the power supply cord 401 is attached to the outlet socket 233, the user slides the socket cover 206 in the direction in which the spring 207 is compressed, and externally exposes the outlet socket 233. At this point, the socket cover sensor 205 is turned on by the opened socket cover 206. In other words, it is detected that the socket cover 206 is open. Note that the unused charge socket 234 is covered by the socket cover 206.

Figure 7B:
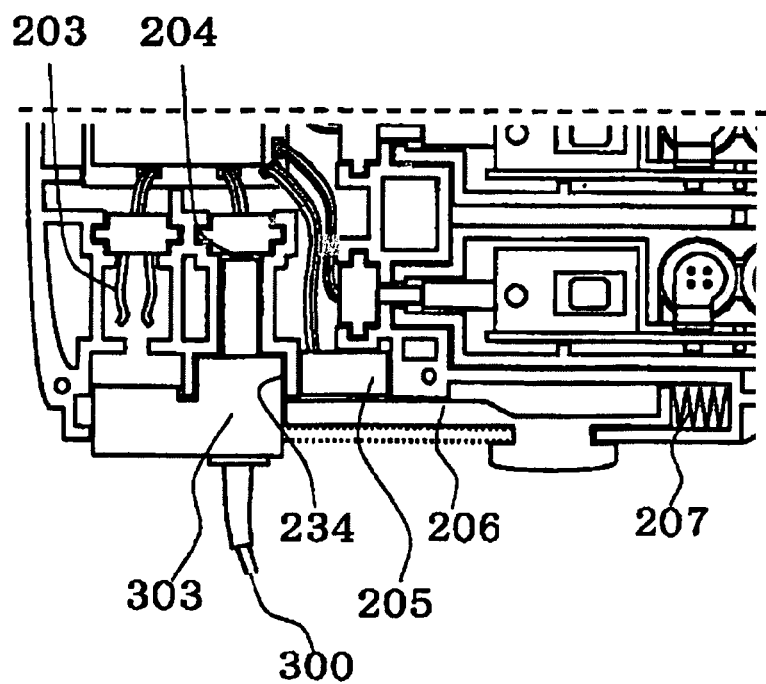
FIG. 7B shows a state in which a charge cord is connected to a charge socket.

FIG. 7B shows the state in which the charge cord 300 is attached to the charge socket 234. As shown in FIG. 7B, a plug 303 having a shape corresponding to the charge socket 234 is provided on the end of the charge cord 300. When the charge cord 300 is attached to the charge socket 234, the user slides the socket cover 206 in the direction in which the spring 207 is compressed, and externally exposes the charge socket 234. At this point, the socket cover sensor 205 is turned on by the opened socket cover 206. In other words, it is detected that the socket cover 206 is open. Note that the unused outlet socket 233 is covered by the plug 303 of the charge cord 300.

As shown in FIG. 6, the housing 211 contains a main circuit unit 202. The aforementioned display lights 209 are provided on the main circuit unit 202. In addition, the main body side power terminals 201, the main body side communication terminals 223 (not shown in FIG. 6), the output terminals 203, the charge terminals 204, the socket cover sensor 205, and the module cover sensor 208 are connected to the main circuit unit 202. The main circuit unit 202 has a microcomputer and various circuit elements, and forms the pack main body 200 circuit shown in FIG. 8.

Figure 8:
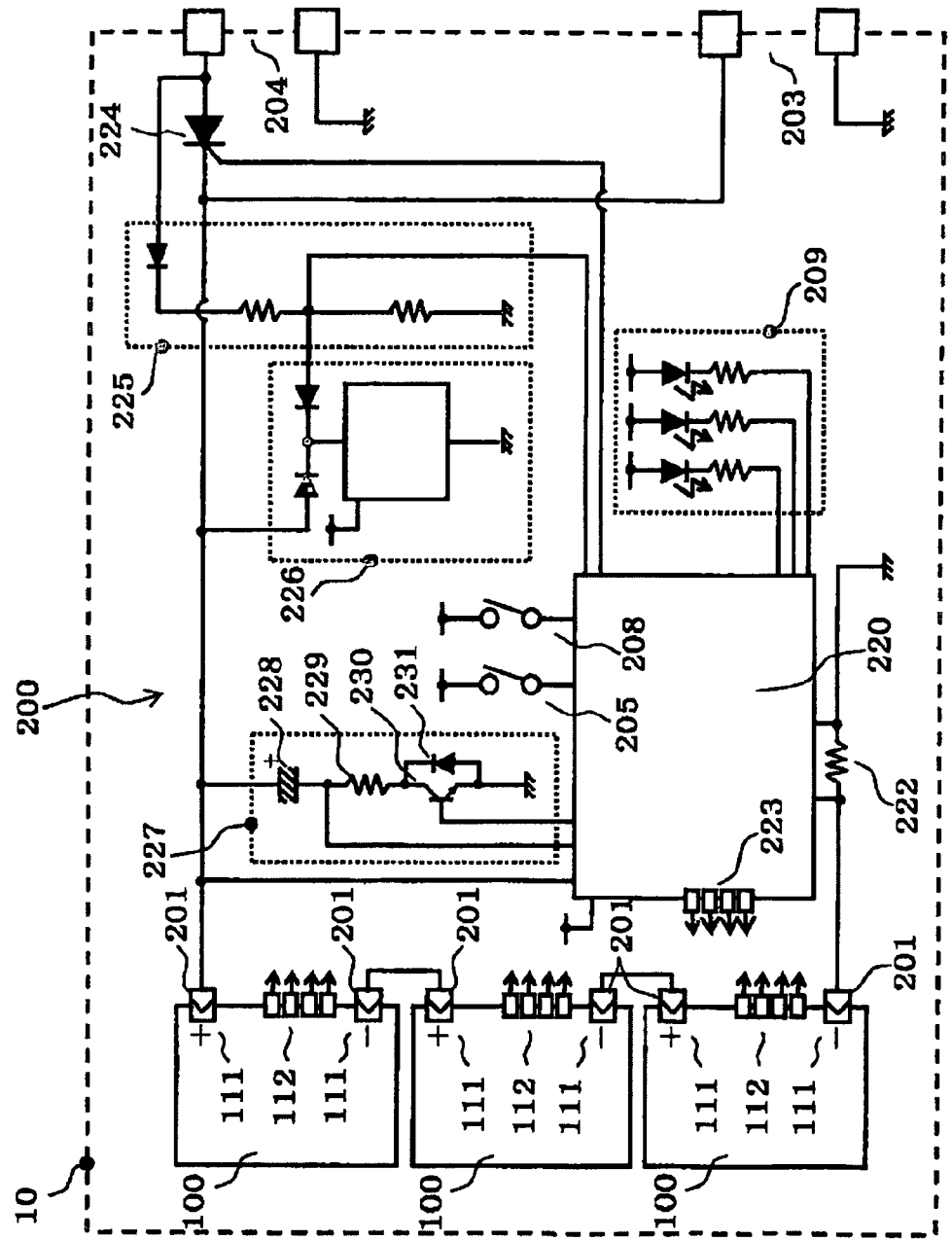
FIG. 8 is a schematic diagram showing the internal circuits of the battery pack including the battery modules.

As shown in FIG. 8, the pack main body 200 internal circuit is further comprised of a main controller 220, a shunt resistor 222, a charge control thyristor 224, a charge power detector 225, a backup power source 226, and a tool switch detector 227. The main controller 220 is constructed to use a microcomputer, and stores a program to perform various processes.

When the battery modules 100 are attached to the pack main body 200, the pair of module side power terminals 111 of the battery module 100 are connected to the pair of main body side power terminals 201 of the pack main body 200. As a result, the three battery modules 100 are connected in series via the pack main body 200. In other words, the 30 battery cells 101 contained in the three battery modules 100 are connected in series. The three battery modules 100 connected in series will hereinafter be simply referred to collectively as the battery modules 100. The battery modules 100 are connected to the pair of outlet terminals 203 and the pair of charge terminals 204. Accordingly, electric power from the battery modules 100 is output from the pair of outlet terminals 203 to the electric power tool 400. In addition, the charge power to the battery modules 100 is input from the commercial power source to the pair of charge terminals 204, and is supplied to the battery modules 100.

When the battery modules 100 are attached to the pack main body 200, the module side communication terminals 112 of the battery modules 100 are connected to the main body side communication terminals 223 of the pack main body 200. Consequently, the main controller 220 is connected to the module controller 120 for each battery module 100 so as to allow communication with each other.

Here, the connection between the main controller 220 and the module controllers 120 is supplemental. With the three battery modules 100 connected in series, the ground potential (reference potential) of each battery module 100 may differ. In other words, each module controller 120 is connected to a ground potential that differs from each other, and differs from the ground potential to which the main controller 220 is connected. Thus, the main controller 220 and the module controllers 120 cannot simply be connected to each other. Accordingly, in the present embodiment, a photocoupler is provided in the communication circuit between the main controller 220 and the module controllers 120 which electrically insulates both. Note that the communication connection between the main controller 220 and the module controllers 120 may be either wired or wireless, and may be either analog communication or digital communication. This method is not particularly limited.

The shunt resistor 222 is an element for detecting the current from the battery modules 100. The shunt resistor 222 is arranged in series with the battery modules 100. The same current as that of the battery modules 100 flows to the shunt resistor 222, and a voltage is generated in response to the current that flows through the battery modules 100. The main controller 220 inputs the voltage generated by the shunt resistor 222, and detects the current of the battery modules 100.

The charge control thyristor 224 is arranged between the battery modules 100 and the charge terminals 204. The charge control thyristor 224 is connected to the main controller 220, and this operation is controlled by the main controller 220. The main controller 220 uses the charge control thyristor 224 to control the charge power to the battery modules 100. The charge control thyristor 224 allows the AC power inputted from the commercial power source to be rectified, and the charge current and the charge voltage to the battery modules 100 to be adjusted.

The charge power detector 225 is connected to the charge terminals 204 and the main controller 220. When the commercial power source is connected to the charge terminals 204, the detected voltage that is rectified and reduced by the charge power detector 225 is input into the main controller 220. The main controller 220 can detect that the commercial power source is connected to the charge terminals 204 by the charge power detector 225.

The backup power source 226 supplies power to the main controller 220. The backup power source 226 has a capacitor or other so-called secondary battery, and can store the discharge power from the battery modules 100 or the charge power supplied to the charge terminals 204. Accordingly, the main controller 220 can operate even when the battery modules 100 have been removed from the pack main body 200 and the commercial power source is not connected to the charge terminals 204.

The power tool switch detector 227 is formed by using a condenser 228, a resistor 229, a transistor 230, and a diode 231. The condenser 228, the resistor 229, and the transistor 230 are connected in series. The diode 231 is connected in parallel with the transistor 230 such that their polarities are opposite each other. The power tool switch detector 227 is connected to the pair of outlet terminals 203 and the main controller 220. The main controller 220 can detect the voltage of the condenser 228, and can control the operation of the transistor 230. The main controller 220 can detect whether the electric power tool 400 is switched on by the power tool switch detector 227.

Here, the power tool switch detector 227 will be described in detail. The main controller 220 detects the voltage of the condenser 228, and if the condenser 228 is not charged, the main controller 220 charges the condenser 228 by turning the transistor 230 on. The charge power flowing to the condenser 228 is supplied from the battery modules 100. At this point, the main controller 220 issues a command to the module controller 120 for each battery module 100, and turn on the discharge FET 123 for each battery module 100. Then, when the main controller 220 detects that the charging of the condenser 228 is complete, the main controller 220 turns off the discharge FET 123 of each battery module 100 and the transistor 230 of the power tool switch detector 227.

When the user turns the switch of the electric power tool 400 on, the electric power that has been charged into the condenser 228 is supplied to the electric power tool 400 via the outlet terminal 203. When this occurs, the discharge FET 123 of each battery module 100 is turned off. Thus, the voltage of the condenser 228 decreases, or the voltages at both terminals of the resistor 229 change from a positive voltage to a negative voltage. The main controller 220 detects that the switch of the electric power tool 400 has been turned on by detecting a change in these voltages. In contrast, the main controller 220 detects that the switch of the electric power tool 400 has been turned off by monitoring the voltage of the shunt resistor 222.

The socket cover sensor 205, the module cover sensor 208, and the display lights 209 are connected to the main controller 220. Accordingly, the main controller 220 can input the detection result of the socket cover sensor 205 and the module cover sensor 208. As noted below, the main controller 220 is programmed to perform various processes based upon the detection result of the socket cover sensor 205 and the module cover sensor 208.

As shown above, the battery pack 10 of the present embodiment comprises a plurality of battery modules 100, and each battery module 100 is removable from the pack main body 200. Thus, when the performance of the battery pack 10 has declined, the user can recover the performance of the battery pack 10 by replacing the battery modules 100 whose degradation has progressed with new ones. When the user is to replace a battery modules 100, the user needs to open the module cover 250. Then, when the user opens the module cover 250, this fact is detected by the module cover sensor 208. Thus, the battery pack 10 of the present embodiment is constructed so that the replacement of a battery module 100 by the user is reliably detected.

With the battery pack 10 of the present invention, when the opening of the module cover 250 is detected, various processes noted below are automatically performed by the module controllers 120 and the main controller 220. These processes are recommended to be performed during the replacement of a battery module 100 by the user. The battery pack 10 can reliably perform these recommended processes, and do not particularly need to be requested by the user.

The control operation performed by the battery pack 10 will be described below with reference to the flowchart shown in FIGS. 9A to 13B. The flowchart of FIGS. 9A, 9B and 9C show the overall flow of the control operations performed by the battery pack 10.

Figure 9A:
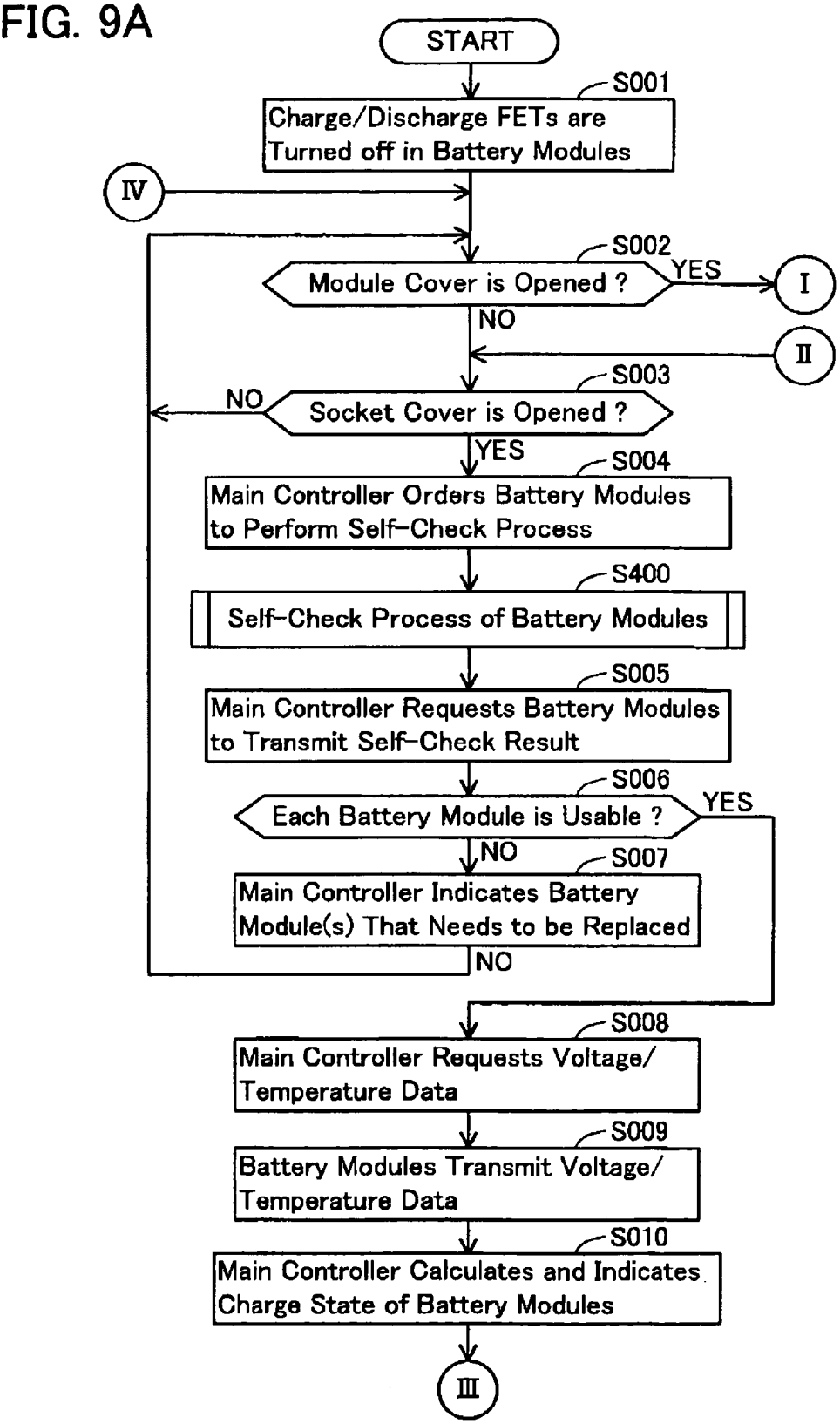
FIGS. 9A, 9B and 9C show a flowchart of processes performed by the battery pack. Note that "I" in FIG. 9A continues to "I" in FIG. 9B, "II" in FIG. 9B continues to "II" in FIG. 9A, "III" in FIG. 9A continues to "III" in FIG. 9C, and "IV" in FIG. 9C continues to "IV" in FIG. 9A.
Figure 9B:
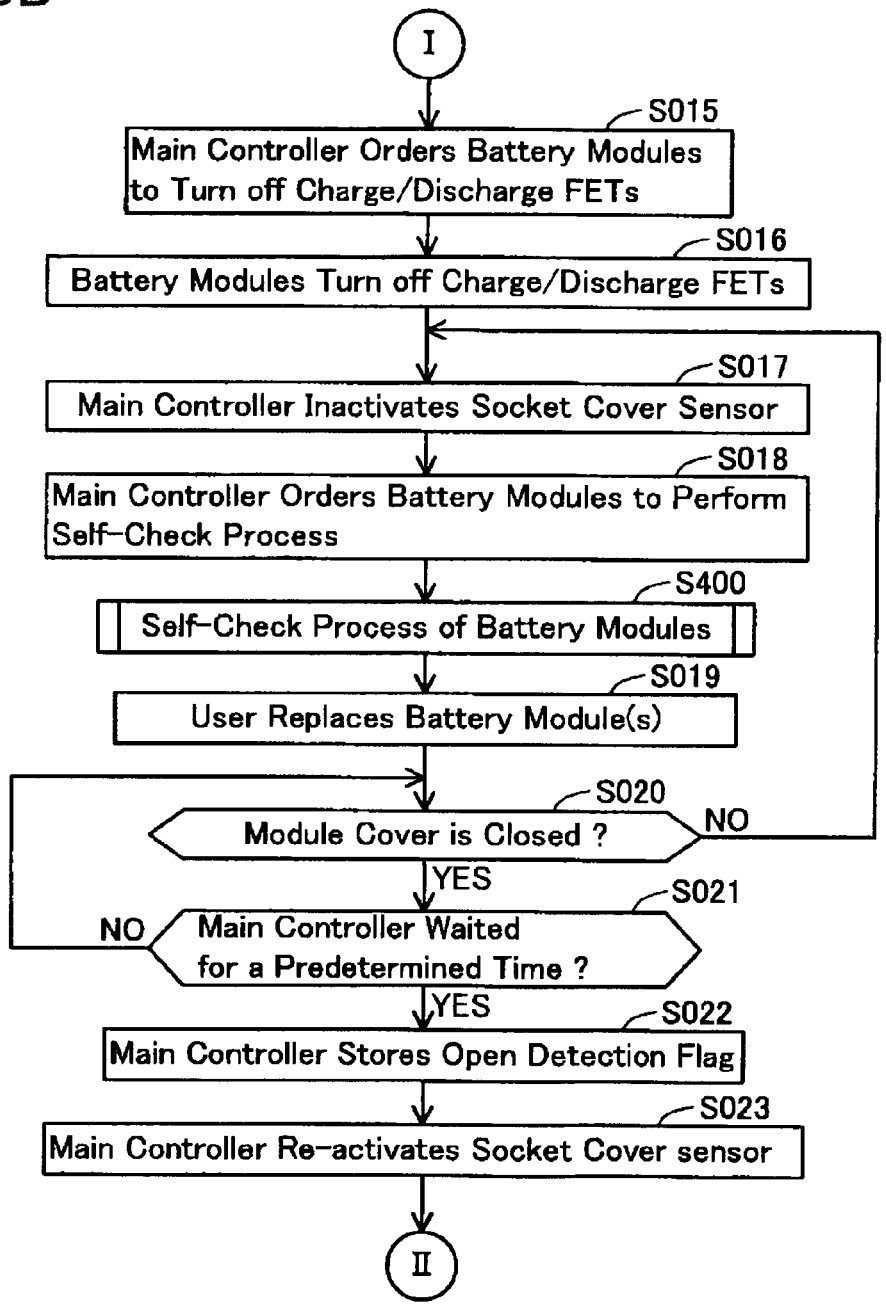
Figure 9C:
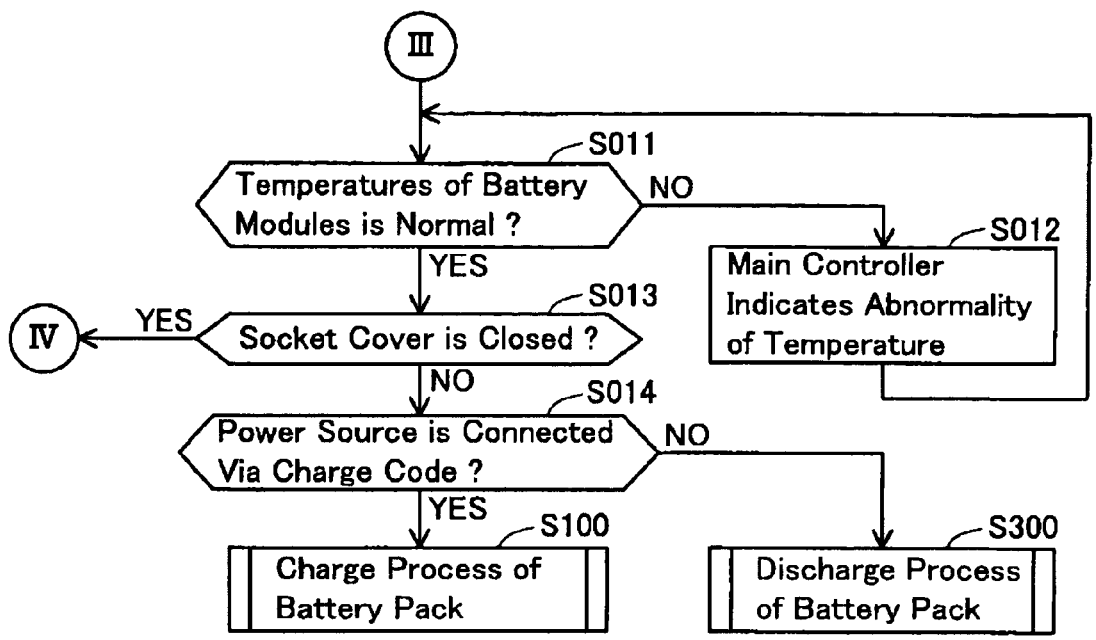

Step S001 of FIG. 9A shows the initial state of the battery pack 10. In the initial state, the three battery modules 100 are attached to the pack main body 200. In addition, the module cover 250 is also attached to the pack main body 200. In other words, the module containing portion 212 is closed by the module cover 250. Furthermore, the socket cover 206 on the pack main body 200 is also closed, and the power supply cord 401 and the charge cord 300 are not attached to the pack main body 200. This state corresponds to the state in which the battery pack 10 is not used, such as when the battery pack 10 is in storage.

In the initial state of Step S001, the discharge FET 123 and the charge FET 124 of each battery module 100 is turned off. Accordingly, the battery cells 101 of each battery module 100 are electrically disconnected from the pack main body 200. In addition, the battery cells 101 of each battery module 100 are also electrically disconnected from the other battery modules 100. As a result, the high voltage of 108 volts is not generated in the interior of the battery pack 10 when the battery pack 10 is not in use. Consequently, even if, for example, the user drops the battery pack 10, or the user suddenly comes into contact with the internal circuit of the battery pack 10, countermeasures is taken so that the user is not subjected to a high voltage.

In Step S002, the main controller 220 confirms whether the module cover 250 is open or closed (attached or detached) according to the module cover sensor 208. Then, the main controller 220 proceeds to Step S015 in FIG. 9B when it detects that the module cover 205 is open. when the main controller 220 does not detect that the module cover 250 is open, the main controller 220 proceeds to Step S003. Although not illustrated in the drawings, after proceeding to Step S003, the main controller 220 continues to monitor the module cover 250, and if when detects that the module cover 250 is open, the process moves to Step S015. Accordingly, the processes of Step S015 and thereafter is performed when the module cover 250 is opened, regardless of when the battery pack 100 is in use (including charging) or not in use.

In Step S003, the main controller 220 confirms whether the socket cover 206 is open or closed according to the socket cover sensor 205. The main controller 220 proceeds to Step S004 when it detects that the socket cover 206 is open. when the main controller 220 does not detect that the socket cover 206 is open, the main controller 220 returns to Step S002. The main controller 220 detects whether or not the battery pack 10 is being used (including charging) by detecting whether the socket cover 206 is open. Then, when the main controller 220 detects that the battery pack 10 is being used, the process moves to Step S004.

In Step S004, the main controller 220 orders the module controller 120 of each battery module 100 to perform the self-check process. The self-check process shown in Step S400 is performed in each battery module 100 by the module controller 120. The self-check process of the battery modules 100 is a process that determines the degradation state of the battery cells 100 installed therein. Details of the self-check process will be described later. In Step S005, the main controller 220 requests the module controller 120 of each battery module 100 to transmit the self-check result. Each module controller 120 that receives this command transmits the self-check result obtained by the self-check process of Step S400 to the main controller 220.

In Step S006, the main controller 220 determines whether or not each battery module 100 is capable of being used based upon the received self-check result. Then, when all of the battery modules 100 are capable of being used, the main controller 220 proceeds to Step S008, and when at least one of the battery modules 100 cannot be used, the main controller 220 proceeds to Step S007.

In Step S007, the main controller 220 uses the display lights 209 of the pack main body 200 to indicate the presence of one or more battery modules 100 that were determined to be incapable of use. In other words, the main controller 220 indicates that one or more battery modules 100 need to be replaced. Then, the main controller 220 returns to Step S002. Thus, in the event that even one of the battery modules 100 is incapable of use, the main controller 220 does not proceed to Step S008. Here, the result of the self-check process by each battery module 100 is displayed by the display light 110 of each battery module 100. Consequently, the user does not mistakenly believe that a battery module 100 needs to be replaced.

In contrast, in the event that the main controller proceeds to Step S008, the main controller 220 requests the voltage data and temperature data for the battery cells 101 from the module controller 120 of each battery module 100. In Step S009, each module controller 120 that received this command detects the voltage and temperature of the battery cells 101, and transmits the voltage data and temperature data according to the detection result to the main controller 220.

In Step S010, the main controller 220 calculates the charge state (the amount of power that can be discharged) for all battery modules 100 based upon the voltage data received from each battery module 100. Then, the main controller 220 displays the calculated charge state using the display lights 209. Here, the main controller 220 calculates the charge state of all battery modules 100 based upon data that correlates the average voltage of all battery cells 101 with voltages stored in advance in memory. However, the calculation of the charge state is not limited to this method, and can be performed by using other methods. In addition, a construction is also possible in which the module controller 120 in each battery module 100 calculates the charge state in the battery cells 101, and the main controller 220 calculates the charge state of all battery modules 100 based upon the charge state calculated by each battery module 100.

In Step S011 shown in FIG. 9C, the main controller 220 determines whether or not the temperature of the battery cells in each battery module 100 is within a normal range based upon the received temperature data. Then, if the main controller 220 confirms that the temperature of the battery cells 101 in at least one battery module 100 is outside the normal range, the main controller 220 proceeds to S012. In contrast, if the main controller 220 confirms that the temperature of the battery cells 101 in all battery modules 100 is within the normal range, the main controller 220 proceeds to S013. If the battery cells 101 are charged or discharged in a high temperature or low temperature state, the amount of degradation greatly increases. Because of that, in Step S011, the main controller 220 determines whether or not the temperature of the battery cells 101 is within a normal range prior to the charge or discharge of the battery cells 101.

When proceeding to Step S012, the main controller 220 displays abnormality of temperature by using the display lights 209. The main controller 220 repeats Steps S011 and Steps S012, and continues to display the abnormality of temperature until the abnormal temperature of the battery cells 101 has been eliminated. In this way, the user can know that the battery cells 101 are at an abnormal temperature, and that the battery pack 10 cannot be used.

In Step S013, the main controller 220 again confirms whether the socket cover 206 is open or closed according to the socket cover sensor 205. Then, the main controller 220 returns to Step S002 in FIG. 9A when it detects that the socket cover 206 is closed. When the main controller 220 does not detect that the module cover 206 is closed, the main controller 220 proceeds to Step S014.

In Step S014, the main controller 220 detects whether or not a commercial power source is connected to the charge terminals 204 via the charge cord 300 by using the charge power detector 225. Then, when the main controller 220 detects a connection with a commercial power source, it proceeds to Step S100 and performs a charge process on the battery pack 10. In contrast, when the main controller 220 does not detect a connection with a commercial power source, it performs a discharge process on the battery pack 10. The charge process and discharge process of the battery pack 10 will be described in detail later.

Next, the processes performed by the main controller 220 when proceeding from Step S002 to S015 will be described. In other words, the processes performed inside the battery pack 10 when the user opens the module cover 250 (Yes in Step S002), and replaces one or more battery modules 100, will be described. In Step S015, the main controller 220 orders each module controller 120 to turn off the discharge FET 123 and the charge FET 124.

In Step S016, the module controllers 120 that received the command turns off the discharge FET 123 and the charge FET 124 in each battery module 100. Accordingly, when the user replaces a battery module 100, the battery cells 101 of each battery module are electrically disconnected from the pack main body 200. In addition, the battery cells 101 of each battery module 100 are also electrically disconnected from the battery cells 101 of the other battery modules 100. Accordingly, the generation of high voltage in the battery pack 10 is prevented. Furthermore, the pair of module side power terminals 111 exposed to the outside on each battery module 100 is electrically disconnected from the battery cells 101. According to this, the user is prevented from receiving an electric shock when the user handles a battery module 100, even if the user touches the pair of module side power terminals 111. In this way, a situation in which the user receives a high voltage shock when replacing a battery module 100 in the battery pack 10 is prevented.

Here, even when the module cover 250 is unexpectedly removed and the battery modules 100 are exposed, a process is performed that disconnects the connection between the battery modules 100, even in an occasion at which the battery modules 100 are not replaced. Thus, a situation in which the user receives an electric shock is prevented, even in the occasion at which the battery modules 100 are not replaced. In addition, by disconnecting the connection between the battery modules 100, the battery pack 10 is no longer able to be charged or discharged. Thus, with the module cover 250 removed, use of the battery pack 10 as a power source, and the charging of the battery pack 10, is prohibited.

In Step S017, the main controller 220 temporarily inactivates the detection result of the socket cover sensor 205. In this configuration, with the module cover 250 in the open state, even if the socket cover 206 is open, and the power supply cord 401 or the charge cord 300 are connected to the outlet socket 233 or the charge socket 234, the main controller 220 is prevented from performing the charge process of Step S100 or the discharge process of Step S300. Here, in Step S017, it is effective to further provide an interlock function that prevents the opening of the socket cover 206. Accordingly, with the module cover 250 in the open state, the socket cover 206 is prohibited from being opened, and the use (charging and discharging) of the battery pack 10 can be physically prevented.

In Step S018, the main controller 220 orders each module controller 120 to perform the self-check process. The self-check process shown in Step 5400 is performed in each battery module 100 by the module controllers 120. The result of the self-check process is displayed by the display light 110 of each battery module 100. In other words, the battery modules 100 that need to be replaced are identified using the display lights 110. Note that the display lights 209 of the pack main body 200 may be used in the same way as the display lights 110 on the battery modules 100.

In Step S019, the user may, in accordance with the display of the display lights 110, 209, replace the battery module(s) 100 that needs to be replaced with new battery module(s) or used battery modules that are still capable of use. Because the battery modules 100 that need to be replaced are automatically identified in the battery pack 10, a situation in which the user mistakenly replaces a normal battery module 100 is prevented. After replacing the battery module 100, the user reattaches the module cover 150 to the pack main body 200.

In Step S020, the main controller 220 confirms whether the module cover 250 is open or closed according to the module cover sensor 208. Then, the main controller 220 proceeds to Step S021 if it detects that the module cover 250 is closed. If the main controller 220 does not detect that the socket cover 206 is closed, the main controller 220 returns to Step S017. At this point, the main controller 220 may communicate with the module controller 120 of each battery module 100, and confirm that all battery modules 100 are correctly connected.

In Step S021, the main controller 220 waits a predetermined delay time after the module cover 250 has been closed. Then, when the module cover 250 continues to remain closed for the predetermined delay time, the main controller 220 proceeds to Step S022. In contrast, when the module cover 250 is reopened before the predetermined delay time has passed, the main controller 220 returns to Step S020.

Due to Step S021, when for example the user notices some type of problem immediately after closing the module cover 250 and reopens the module cover 250, the main controller 220 is prevented from unnecessarily proceeding to Step S022 and thereafter. Or, the module cover sensor 208 may sometimes detect that the module cover 250 is closed prior to the module cover 250 being completely closed due to the position or sensitivity of the module cover sensor 208. Even in this situation, by providing a delay time in Step S021, the main controller 220 is prevented from proceeding to Step S022 and thereafter prior to the module cover 250 being completely closed.

In Step S022, the main controller 220 stores an open detection flag that indicates that an open module cover 250 has been detected by the module cover sensor 208. This open detection flag means that the module cover 250 is open and the replacement of a battery module 100 has occurred. In Step S023, the main controller 220 re-activates the socket cover sensor 205 that has been inactivated from Step S017. Then, the main controller 220 moves to Step S003 in FIG. 9A.

Here, in Step S019, it can be assumed that the user has not replaced a battery module 100 that needs to be replaced. Or, it can be assumed that the user has not installed three battery modules 100 in the pack main body, and has closed the module cover 250. In this case, the main controller 220 can recognize that the user has not correctly completed the replacement of one or more battery modules 100 from Steps S004 to S007.

Figure 10A:
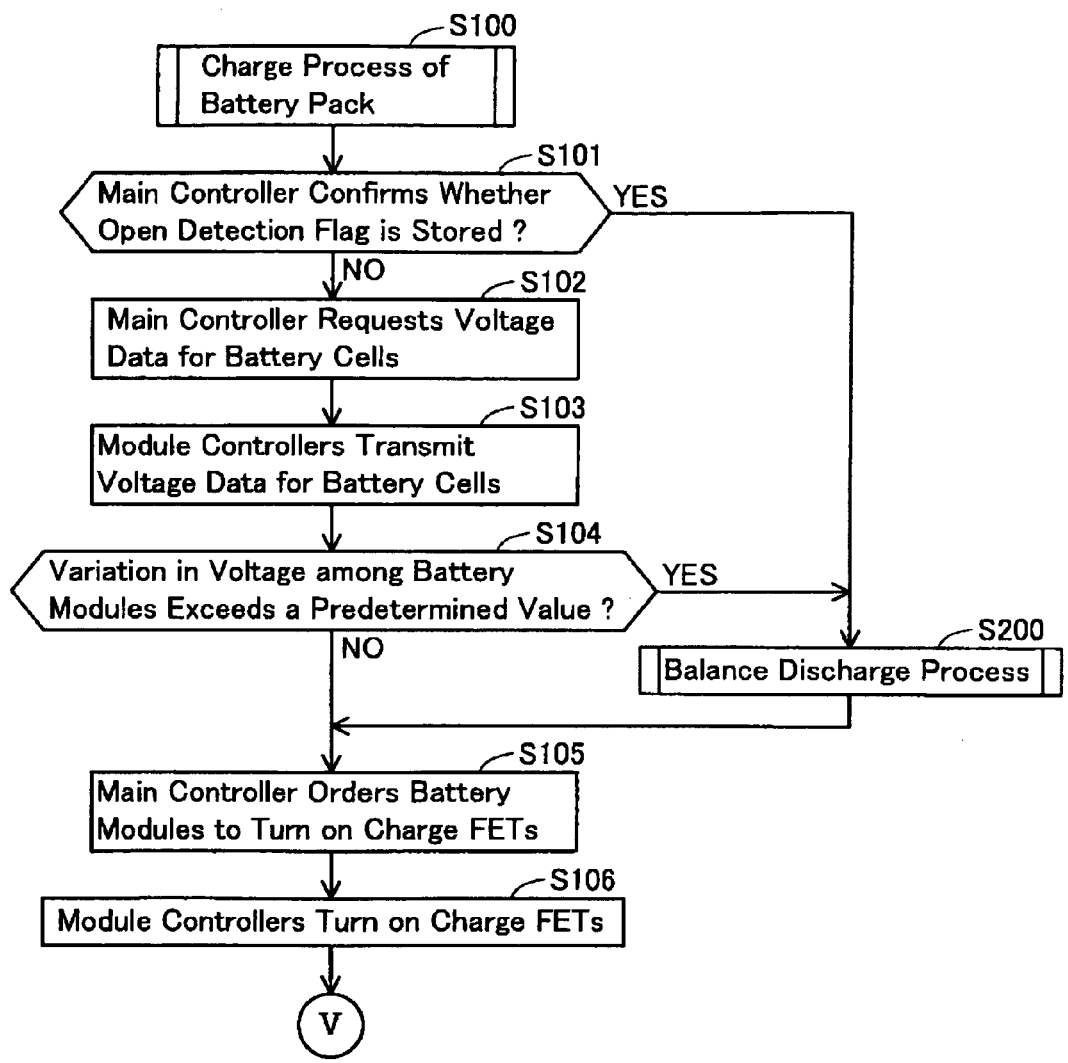
FIGS. 10A and 10B show a flowchart of a battery pack charge process. Note that "V" in FIG. 10A continues to "V" in FIG. 10B.
Figure 10B:
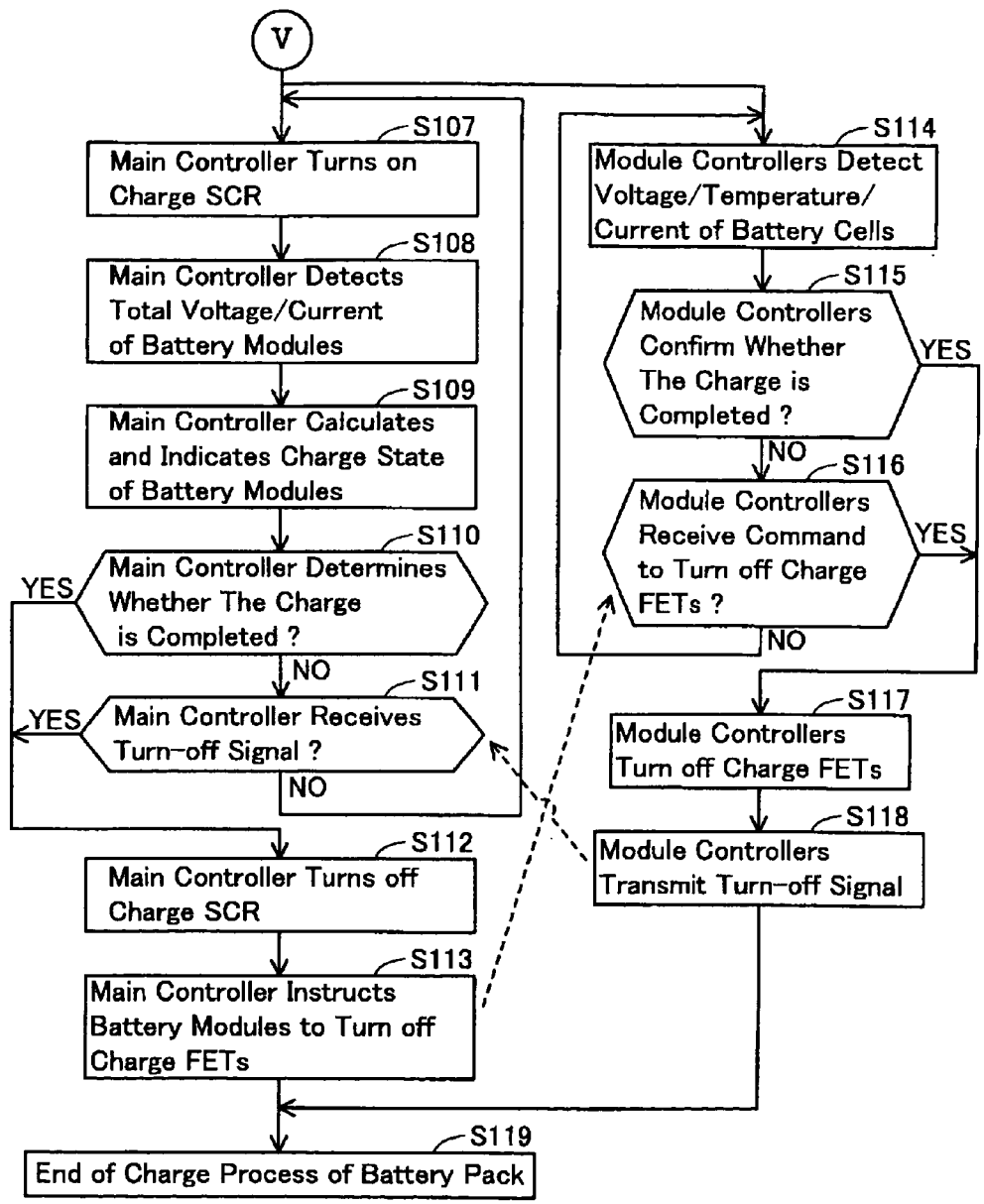

Next, the charge process for the battery pack 10 shown in Step S100 of FIG. 9C will be described with reference to FIGS. 10A and 10B. As described earlier, at the point at which the charge process has begun in Step S100, a commercial power source is connected via the charge cord 300 to the charge terminals 204 of the battery pack 100. In Step S101 shown in FIG. 10A, the main controller 220 confirms whether or not the open detection flag is stored. Then, the main controller 220 proceeds to Step S200 when the open detection flag is stored, and when not, the main controller 220 proceeds to Step S102.

Here, the main controller 220 storing the open detection flag means that the module cover 250 is opened at least once after the battery pack 10 has completed charging. In other words, it means that there is the possibility that the replacement of the battery module 100 has occurred. In this type of situation, the main controller 220 performs the balance discharge process shown in Step S200.

In the event that the replacement of the battery module 100 has occurred, the newly replaced battery module 100 has a different charge state than the remaining battery modules 100. When the plurality of battery modules 100 having unequal charge states is connected in series, some of the battery modules 100 degrade quickly. Therefore, the charge state of the battery modules 100 must be equalized after the replacement of the battery module 100 has occurred. Accordingly, in the event there is a possibility that the replacement of the battery module 100 has occurred, the balance discharge process is automatically performed by the battery pack 10 of the present embodiment which selectively discharges the battery modules 100 having a higher charge state. Details of the balance discharge process will be described later.

In Step S102, the main controller 220 requests voltage data for the battery cells 101 from each module controller 120. In Step S103, each module controller 120 that received this command detects the voltage of the battery cells 101, and transmits the voltage data according to the detection result to the main controller 220.

In Step S104, the main controller 220 calculates voltage for the battery cells 101 connected in series for each battery module 100, based upon the received voltage data. Then, the main controller 220 proceeds to Step S200 when a variation in the voltage of the battery cells 100 among the battery modules 100 exceeds a predetermined value. When not, the main controller proceeds to Step S105. Here, the overall voltage of the battery cells 101 changes in response to the charge state of the battery cells 101. Thus, when the voltage of the battery cells 101 varies among the battery modules 100, this means that the charge state of the battery cells 101 varies between the battery modules 100. In this type of situation, the balance discharge process of Step S200 is performed, regardless of whether or not a battery module 100 has been replaced.

In Step S105, the main controller 220 orders each module controller 120 to turn on the charge FET 124. In Step S106, the charge FET 124 in each battery module 100 is turned on by the module controllers 120. In Step S107 shown in FIG. 10B, the main controller 220 turns on the charge control thyristor 224, and begins charging the battery modules 100. While the battery modules 100 are charging, the main controller 220 performs Steps S107 to S113 in FIG. 10B, and the module controller 120 of each battery module 100 performs Steps S114 to S118 in FIG. 10B.

As will be described below, the charging of the battery modules 100 is performed by the constant current—constant voltage method. In other words, the first part of the charging is performed at a constant current, and the latter part of the charging is performed at a constant voltage.

In Step S108, the main controller 220 detects the total voltage and current of all battery modules 100 connected in series. Then, the main controller 220 controls the operation of the charge control thyristor 224 based upon the voltage and current of all detected battery modules 100. More particularly, until the total voltage of all battery modules 100 reaches a predetermined maximum voltage, the firing angle of the charge control thyristor 224 is adjusted so that the charge current flowing to the battery modules 100 does not exceed a predetermined target current value. Then, after the total voltage of all battery modules 100 has reached the predetermined maximum voltage, the firing angle of the charge control thyristor 224 is adjusted so that the total voltage of the battery modules 100 is maintained at a predetermined target voltage value that is lower than the maximum voltage value. Here, the main controller 220 can change the aforementioned target current value and the target voltage value in response to the detected temperature of the battery cells 101.

In Step S109, the main controller 220 calculates the charge state for all battery modules 100 based upon the detected voltage of all battery modules 100. Then, the main controller 220 displays the calculated charge state with the display lights 209. The process of Step S109 is performed in the same way as that of S010 of FIG. 9A.

In Step S110, the main controller 220 determines whether or not the charge process for the battery modules 100 is complete. Here, the main controller 220 determines that the charge process is complete when the battery cells 101 of the battery modules 100 have reached full charge based upon the voltage and current of all battery cells 101, when the charge voltage and the charge current cannot be adequately controlled due to damage to the internal circuit or voltage fluctuations in the commercial power source, when the communication with each module controller 120 is cut off, or when the voltage between each battery module 100 exceeds a predetermined value. Then, the main controller 220 proceeds to Step S112 if it determines that the charge process is complete. If not, the main controller 220 proceeds to Step S111.

In Step S111, the main controller 220 proceeds to Step S112 when in the event that the main controller 220 receives a turned-off-signal from at least one module controller 120. Here, as described below, the turned-off signal is outputted form the module controller 120 when the module controller 120 turn off the charge FET 124 within the battery module 100. When the turned-off signal has not been received, the main controller 220 returns to Step S107. In other words, the charge process of the battery pack 10 continues. In Step S112, the main controller 220 turns off the charge control thyristor 224, and ends the charging of the battery modules 100. In Step S113, the main controller 220 orders each module controller 120 to turn off the charge FET 124. This command will be used in Step S116 of the module controllers 120 described below.

According to the above, the processes performed by the main controller 220 will be complete with the charge process of the battery pack 10.

In parallel with the aforementioned processes of the main controller 220, Steps S114 to S118 described below are performed by the module controller 120 in each battery module 100. In Step S114, each module controller 120 detects the voltage, current, and temperature of the battery cells 101. The detected voltages, currents, and temperatures are transmitted to the main controller 220, and are used in the aforementioned processes of the main controller 220.

In Step S115, each module controller 120 determines whether or not the charging of the battery cells 101 is complete. The module controllers 120 determine that the charging of the battery cells 101 is complete when the voltage of at least one of the battery cells 101 has exceeded a predetermined maximum value, when the charge current flowing to the battery cells 101 has exceeded a predetermined maximum, when the temperature of the battery cells 101 is outside a predetermined temperature range, when the voltage between the battery cells 101 is greater than a predetermined value, or when the communication with the main controller 220 is cut off. Then, the module controller 120 proceeds to Step S117 if it determines that the charging of the battery cells is complete. If not, the module controller 220 proceeds to Step S116.

In Step S116, each module controller 120 proceeds to Step S117 in the event that a command to turn off the charge FET 124 is received from the main controller 220 (see Step S113). when this command is not received, the module controllers 120 return to Step S114.

In Step S117, each module controller 120 turns off the charge FET 124. Accordingly, the charging of the battery cells 101 is stopped. In Step S118, each module controller 120 transmit the turned-off signal to the main controller 220 for notifying that the charge FET 124 has been turned off. This signal is used in Step S111 of the main controller 220. According to the above, the processes performed by each module controller 120 will be complete with the charge process of the battery pack 10.

As described above, the charge state is monitored during the charge process of the battery pack 10 by the main controller 220 and each module controller 120. Then, in the event that at least one of the controllers 220, 120 determine that charging must be stopped, the controller 220, 120 can independently complete the charging. Furthermore, the other controllers 220, 120 serially perform a process to complete the charging in the same way as the previous controller did. Even if some of the controllers 220, 120 are damaged, the charging of the battery modules 100 can be completed in series if the main controller 220 turns the charge control thyristor 224 off, or at least one of the module controllers 120 turns the charge FET 124 off.

At the point the charge process has completed, the battery cells 101 of each battery module 100 are electrically disconnected from the pack main body 200. In addition, the battery cells 101 of each battery module 100 are also electrically disconnected from the battery cells 101 of the other battery modules 100. Accordingly, a high voltage will not be needlessly generated inside the battery pack 10 after the charge process has been completed. Furthermore, the pair of module power terminals 111 exposed to the outside on each battery module 100 is electrically disconnected from the battery cells 101. Accordingly, the battery modules 100 are prohibited from being both charged and discharged. The battery modules 100 can be charged only by the pack main body 200, and are prohibited from being charged by other irregular charging devices.

Figure 11A:
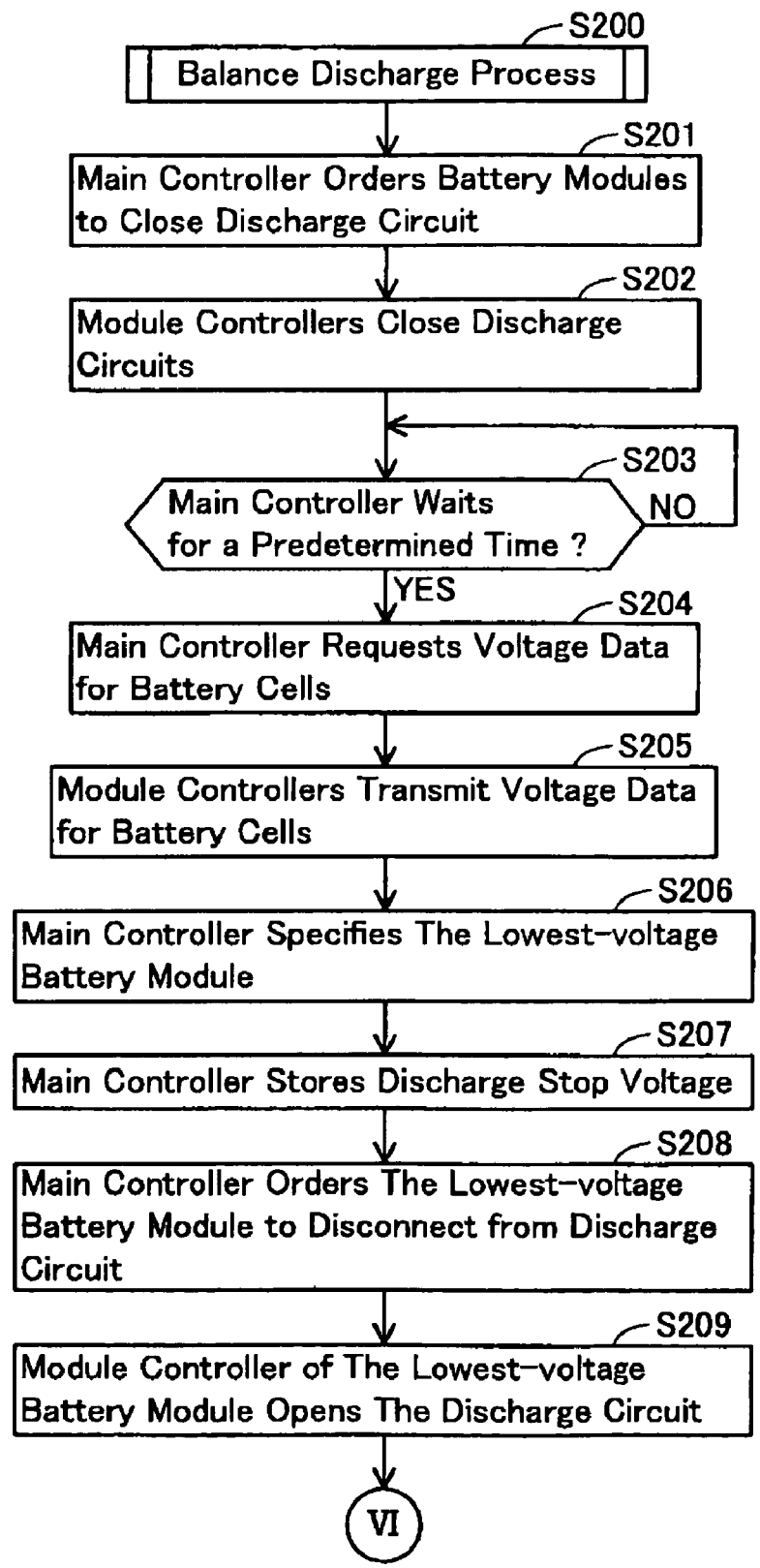
FIGS. 11A and 11B show a flowchart of a balance discharge process. Note that "VI" in FIG. 11A continues to "VI" in FIG. 11B.
Figure 11B:
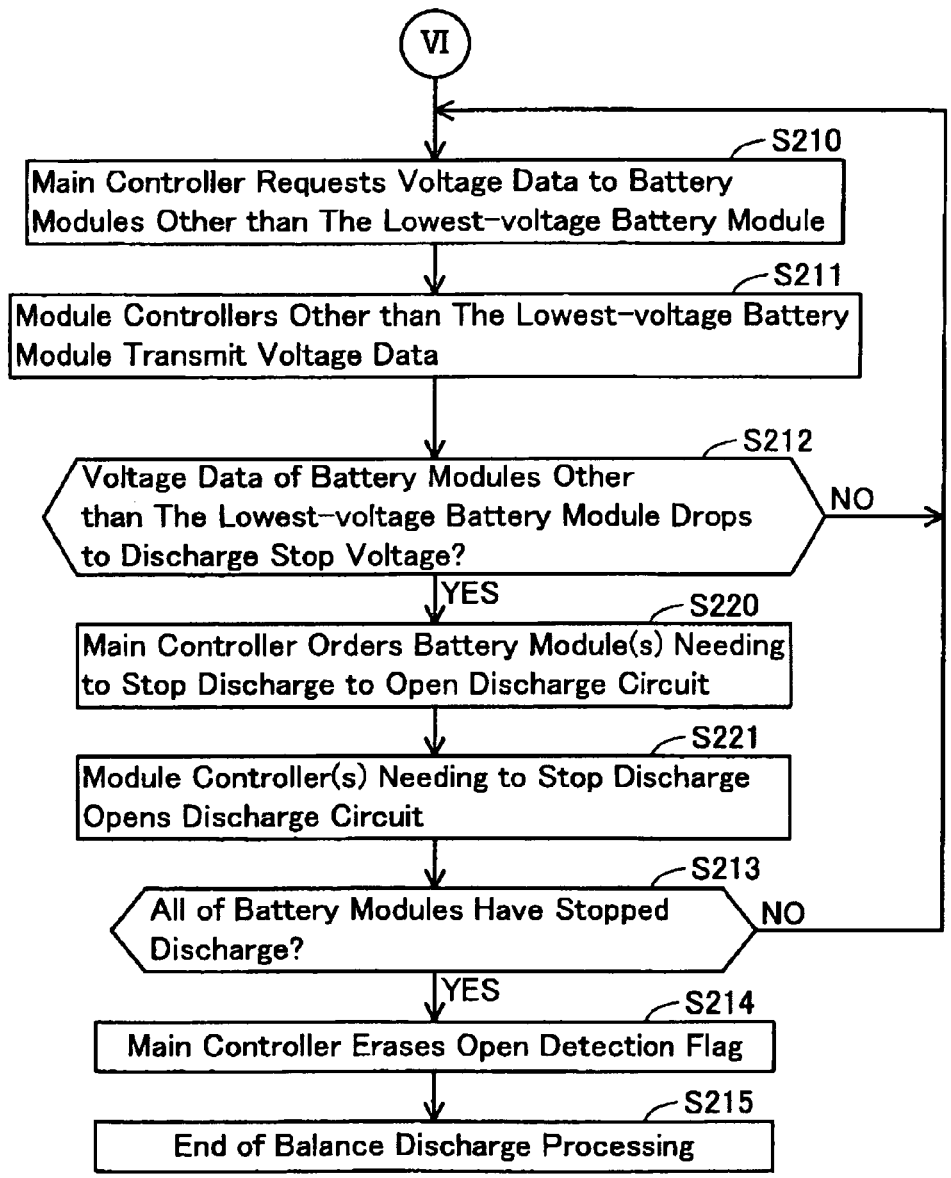

Next, the balance discharge process shown in Step S200 of FIG. 10A will be described with reference to FIGS. 11A and 11B. As described previously, the discharge FET 123 and the charge FET 124 of each battery module 100 have been turned off when the balance discharge process begins in Step S200. Accordingly, the pair of module side power terminals 111 on each battery module 100 is electrically disconnected from the battery cells 101. Thus, the battery cells 101 of each battery module 100 are electrically disconnected from the pack main body 200.

As described previously, each battery module 100 includes the discharge circuit 127 that connects the battery cells 101 to the energy-consuming element 125. Thus, each battery module 100 can discharge the battery cells 101 even when electrically disconnected from the pack main body 200. In contrast, if it is configured that each battery module 100 is discharged by the pack main body 200, the internal circuit of the pack main body 200 becomes complex because each battery module 100 has a different ground potential. More specifically, discharge circuits that are insulated from each other as well as various sensors must be provided in the internal circuit of the pack main body 200 for each battery module 100.

In Step S201, the main controller 220 orders each module controller 120 to close the discharge circuit 127. In Step S202, each module controller 120 that received the command turns the transistor 126 on to close the discharge circuit 127. The discharge circuit 127 having the energy-consuming element 125 is connected to the battery cells 101, and the discharge of the battery cells 101 begins.

In Step S203, after the command of Step S201 is performed, the main controller 220 waits a predetermined period of time. This predetermined period of time may be set to be short, e.g., several seconds. Then, in Step S204, the main controller 220 requests voltage data that indicate the detected voltage of the battery cells 101 from each module controller 120.

In Step S205, the module controllers 120 that received the command of Step S201 transmits the voltage data that indicates the detected voltage of the battery cells 101. Here, the voltage of the battery cells 101 tends to fluctuate unstably just after the discharge has begun. Therefore, it is configured in this embodiment that the main controller 220 waits the predetermined period of time in Step S203 before requesting the voltage data to the module controllers 120 in Step S204. Usually, the voltage of the battery cells 101 can be stable in a short time. Thus, the predetermined period of time in Step S203 may be set to a short time, which can shorten the time needed for the balance discharge process.

In Step S206, the main controller 220 specifies the battery module 100 with the lowest voltage battery cells as the lowest voltage battery module 100, based upon the voltage data received from each module controller 120. The lowest voltage battery module 100 that is so specified will be the battery module 100 having battery cells with the lowest charge state. Then, in Step S207, the main controller 220 stores the voltage of the battery cells 101 of the lowest voltage battery module 100 as the discharge stop voltage.

In Step S208, the main controller 220 orders the module controller 120 of the lowest voltage battery module 100 to disconnect with the discharge circuit 127. In step S209, the module controller 120 of the lowest voltage battery module 100 that received this command turns the transistor 126 of the discharge circuit 127 off to electrically open the discharge circuit 127 with respect to the battery cells 101. Accordingly, the discharge of the battery cells 101 in the lowest voltage battery module 100 is suspended. In Step S210 shown in FIG. 11B, the main controller 220 requests voltage data that indicates the detected voltage of the battery cells 101 from the module controllers 120 of the other battery modules except the lowest voltage battery module 100. In Step S211, the module controllers 120 that received the command transmit the voltage data that indicates the detected voltage of the battery cells 101.

In Step S212, the main controller 220 compares the voltage data received from each module controller 120 with the stored discharge stop voltage, and specifies the battery module 100 in which the detected voltage of the battery cells 101 has dropped to the discharge stop voltage. The battery module 100 that is specified here is the battery module 100 having battery cells 101 that have been discharged to an appropriate charge state, and in which the discharge of the battery cells 101 must be stopped. Then, the main controller 220 proceeds to Step S220 when at least one of the battery modules 100 has been specified. When not, the main controller 220 returns to Step S210.

In Step S220, the main controller 220 orders the module controller 120 of the battery module 100 specified in Step S212 to electrically open the discharge circuit 127. In step S221, the module controller 120 that received this command turns the transistor 126 of the discharge circuit 127 off, and electrically opens the discharge circuit 127 with respect to the battery cells 101. Consequently, the discharge of the battery cells 101 is stopped in the battery module 100 in which the detected voltage in the battery cells 101 has dropped to the discharge stop voltage.

In Step S213, the main controller 220 proceeds to Step S214 when the discharge of the battery cells 101 in all battery modules 100 has been stopped. When not, the main controller 220 returns to Step S210. In Step S214, the main controller 220 erases the open detection flag stored in Step S022 of FIG. 9B. Accordingly, the stored open detection flag is erased at the timing when the balance discharge process is substantially complete. Erasing the open detection flag is substantially equivalent to storing the fact that at least one balance discharge process has been performed on the battery modules 100 installed in the pack main body 200. Thus, instead of the main controller 220 erasing the stored open detection flag, it is also effective for the main controller 220 to add a flag to the stored open discharge flag that indicates the completion of the balance discharge process.

Here, the timing when the open detection flag is erased is not limited to after the completion of the balance discharge process, and can also be at another timing, such as when the balance discharge process has begun. However, if the timing when the open detection flag is erased is when the balance discharge process is complete, then the balance discharge process is automatically performed again during the next charging in the event that the balance discharge process has not been completed for some reason.

When the balance discharge process performed on the battery modules 100 is complete, the charge states of the battery modules 100 are substantially equalized. As shown in FIG. 10A, after the completion of the balance discharge process, the charge process for the battery modules 100 is performed. Because the charge state of the battery modules 100 are equalized, the battery modules 100 can be charged with a greater amount of electric power in the charge process. Note that instead of the aforementioned balance discharge process, a balance charge process may be performed that selectively charges one or a plurality of battery modules 100. The charge state of the battery modules 100 can be equalized by either of the balance processes, i.e., the balance discharge process or the balance charge process.

In the balance discharge process of the present embodiment, the voltage of each battery module 100 is detected from Step S201 to S204, the voltage of the lowest voltage battery module 100 is set to the discharge stop voltage, and the discharge of the other battery modules 100 is performed. According to this method, it is possible to perform the balance discharge process in a relatively short period of time. In contrast to this, a preset discharge stop voltage may be used in the balance discharge process in another embodiment. However, in such a embodiment, if a battery module 100 having a relatively high charge state is present, the time needed for the balance discharge process is relatively long.

Figure 12A:
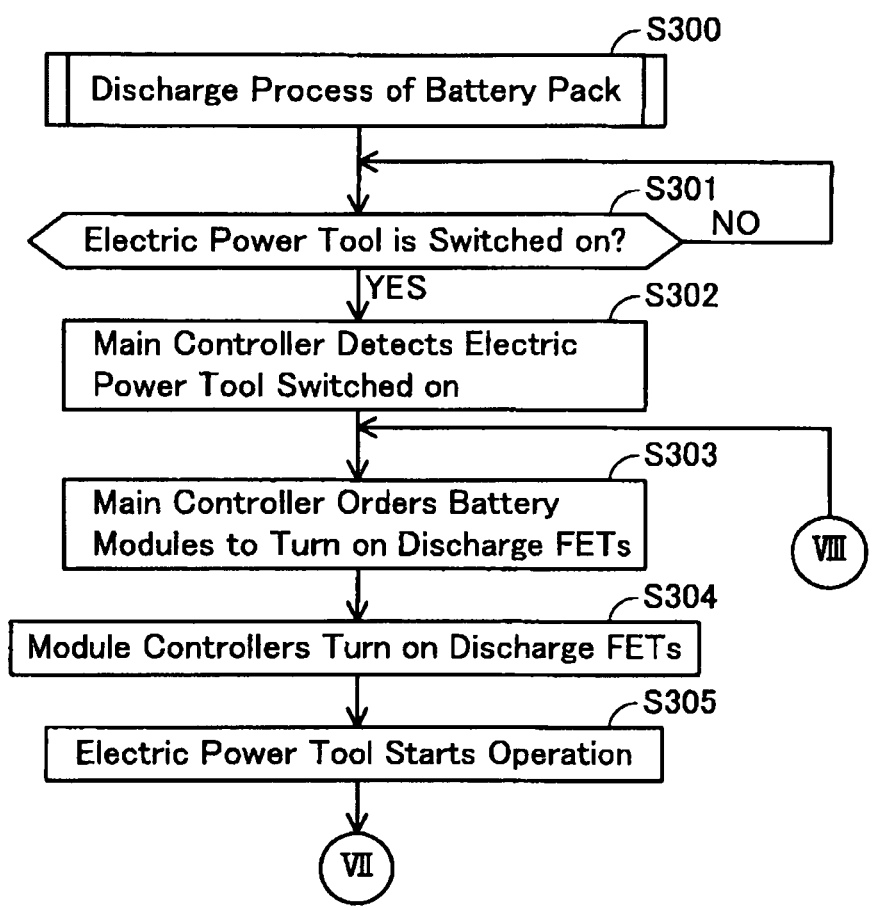
FIGS. 12A and 12B show a flowchart of a battery pack discharge process. Note that "VII" in FIG. 12A continues to "VII" in FIG. 12B, and "VIII" in FIG. 12B continues to "VIII" in FIG. 12A.

Next, the discharge process for the battery pack 10 shown in Step S300 of FIG. 9C will be described with reference to FIGS. 12A and 12B. The battery pack 10 performs the discharge process shown in FIGS. 12A and 12B when the battery pack 10 is used as a power source for the electric power tool 400. The user uses the power supply cord 401 to connect the battery pack 10 to the electric power tool 400, and turns on the switch on the electric power tool 400. In Steps S301 and S302, the main controller 220 monitors the switch on the electric power tool 400 with the tool switch detector 227. Then, the main controller 220 proceeds to Step S303 when it detects that the electric power tool 400 has been switched on.

In Step S303, the main controller 220 orders the module controller 120 of each battery module 100 to turn on the discharge FET 123. In Step S304, each module controller 120 that received this command turns the discharge FET 123 on. Accordingly, the three battery modules 100 are connected in series, and these battery modules 100 are electrically connected to the electric power tool 400. In Step S305, the battery pack 10 supplies electric power to the electric power tool 400, and the electric power tool 400 start its operation.

Figure 12B:
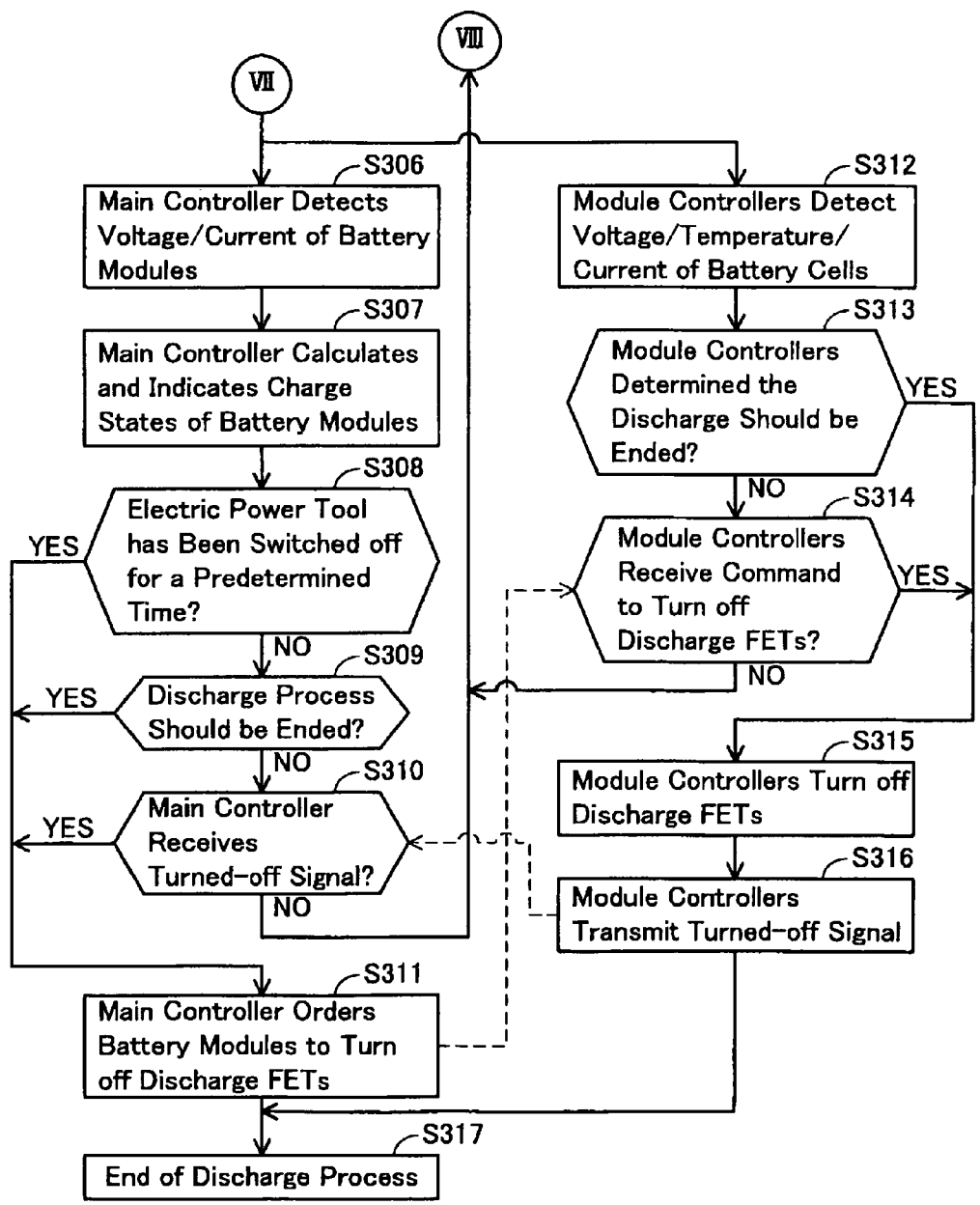

Thereafter, the main controller 220 performs Steps S306 to S311 in FIG. 12B, and in parallel with this, each module controller 120 performs Steps S312 to S316 in FIG. 12B.

In Step S306, the main controller 220 detects the voltage and current for all battery modules 100. In Step S307, the main controller 220 calculates the charge state for all battery modules 100 based upon the detected voltages of all battery modules 100. Then, the main controller 220 displays the calculated charge state with the display lights 209. The process of Step S307 is performed in the same way as that of S010 of FIG. 9A.

In Step S308, the main controller 220 detects whether or not the electric power tool 400 has been switched off for a predetermined period of time based upon the detected current of all battery modules 100. Here, the main controller 220 determines that the electric power tool 400 is switched off when the current from all battery modules 100 drops below a lower limit. In this situation, the main controller 220 proceeds to Step S311. In Step 311, main controller 220 orders each module controller 120 to turn off the discharge FET 123. In this configuration, the discharge FETs 123 of battery modules 100 are turned off in conjunction with switching off of the electric power tool 400. By turning off the FETs 123, the battery pack 10 electrically disconnects the battery modules 100 from each other while the electric power tool 400 is switched off For example, the predetermined period of time in Step S308 may be set to approximately 0.1 second. In this case, the discharge FETs 123 are turned off at the substantially same timing when the electric power tool 400 is switched off.

In Step S309, the main controller 220 determines whether or not the discharge process of the battery modules 100 should be ended. Here, based upon the detected voltage and current of all battery modules 100, the main controller 220 determines that the discharge process should be ended when it has detected that the battery modules 100 have been over-discharged or overloaded, when communication with each module controller 120 has been cut off, or when a variation in voltage among the battery module 100 is equal to or greater than a limited value. Then, the main controller 220 proceeds to Step S311 when it has determined that the discharge process should be ended. When not, the module controller 220 proceeds to Step S310.

In Step S310, the main controller 220 proceeds to Step S311 in the event that the main controller 220 receives the turned-off signal from at least one module controller 120. Here, this turned-off signal is transmitted from the module controllers 120 in Step S316 described below. When this signal has not been received, the main controller 220 returns to Step S303 in FIG. 12A and the discharge process of the battery pack 10 continues. In Step S311, the main controller 220 orders each module controller 120 to turn off the discharge FET 123. This command is used by the module controllers 120 in Step S314 described below.

Next, processes of Steps S312 to S316 performed by the module controller 120 in each battery module 100 will be described below. The processes of Steps S312 to S316 are performed by the module controller 120 in parallel with the aforementioned processes of Steps S306 to S311 performed by the main controller 220.

In Step S312, each module controller 120 detects the voltage, current, and temperature of the battery cells 101. In Step S313, each module controller 120 determines whether or not the discharge of the battery cells 101 should be ended. Here, the module controllers 120 determines that the discharge of the battery cells 101 should be ended when the voltage of at least one of the battery cells 101 has fallen below a predetermined minimum voltage (a discharge stop voltage for a battery cell 101), when the current flowing to the battery cells 101 has exceeded a predetermined maximum value due to a short circuit or overloading, when the temperature of the battery cells 101 is outside a predetermined temperature range, when a variation in voltage among the battery cells 101 is greater than a predetermined value, or when the communication with the main controller 220 is cut off. Then, the module controller 120 proceeds to Step S315 when it determines that the discharge of the battery cells 101 must be ended. When not, the module controller 220 proceeds to Step S314.

In Step S314, each module controller 120 proceeds to Step S315 in the event that a command to turn off the discharge FET 123 is received from the main controller 220 (see Step S311). when this command has not been received, the module controllers 120 returns to Step S303. In Step S315, each module controller 120 turns off the discharge FET 123. Consequently, the discharge of the battery cells 101 is ended.

In Step S316, each module controller 120 transmits the turned-off signal to the main controller 220 for notifying that the discharge FET 123 has been turned off. This signal is used in Step S310 of the main controller 220. According to the above, the processes performed by each module controller 120 will be complete in the discharge process of the battery pack 10.

As described above, in the discharge process of the battery modules 100, the main controller 220 and each module controller 120 monitors the discharge status, and in the event that at least one of the controllers 220, 120 determine that the discharge should be ended, the controllers 220, 120 can independently end the discharge. In this case, the other of controllers 220, 120 serially perform a process to end the discharge. Therefore, even if some of the controllers 220, 120 are damaged and do not function, the discharge of the battery modules 100 can be ended.

When the discharge process is ended, the battery cells 101 of each battery module 100 are electrically disconnected from the pack main body 200. In addition, the battery cells 101 of each battery module 100 are also electrically disconnected from the battery cells 101 of the other battery modules 100. Accordingly, a high voltage will not be needlessly generated inside the battery pack 10 after the discharge process is ended. Furthermore, the pair of module power terminals 111 exposed to the outside on each battery module 100 is electrically disconnected from the battery cells 101. In this configuration, the battery modules 100 are prohibited from being both charged and discharged. The battery modules 100 can be discharged only by the pack main body 200, and are prohibited from being discharged by other irregular charging devices.

Figure 13A:
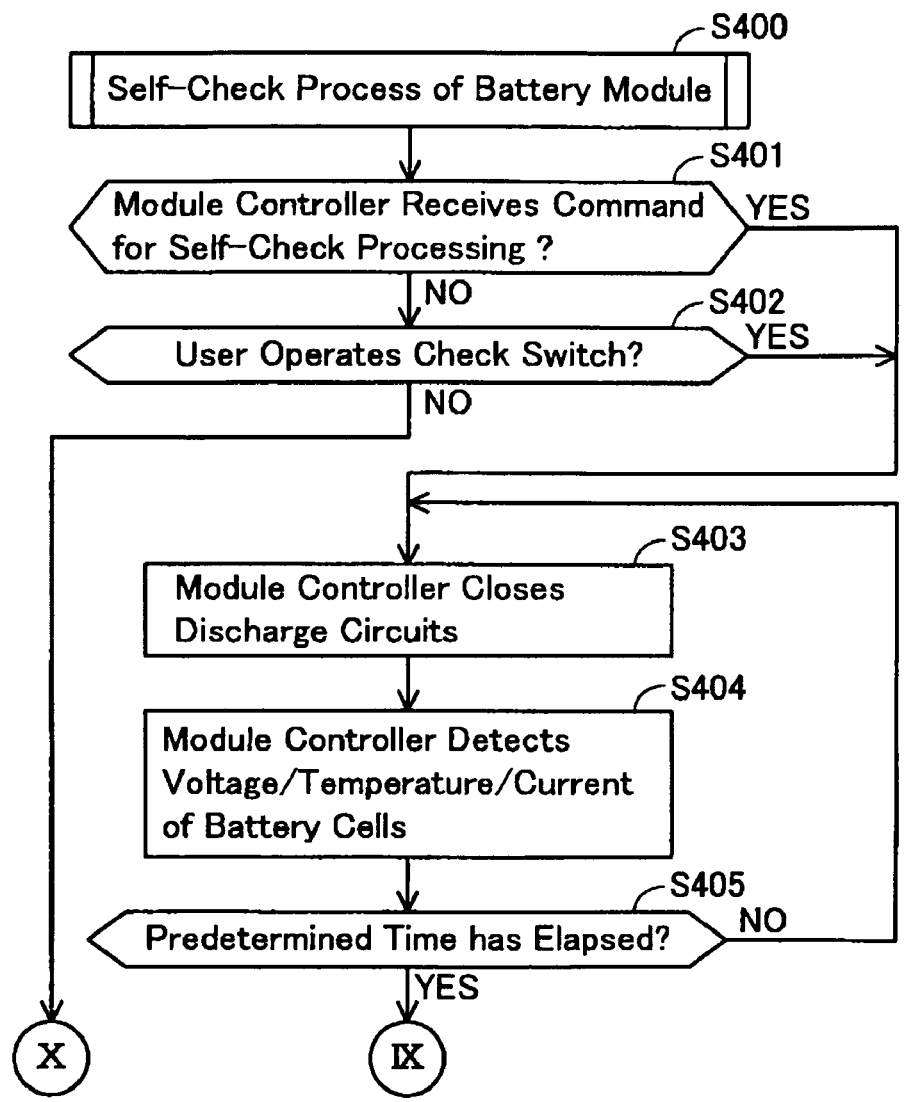
FIGS. 13A and 13B show a flowchart of a battery module self-check process. Note that "IX" in FIG. 13A continues to "IX" in FIG. 13B, and "X" in FIG. 13A continues to "X" in FIG. 13B.

Next, the self-check process for the battery modules 100 shown in Step S400 of FIG. 9B will be described with reference to FIGS. 13 and 13B. As described above, each battery module 100 performs a self-check process that determines the degradation state of the installed battery cells 101, in response to a command from the main controller 220 or operation to the check switch 109 by the user.

In Step S401, each module controller 120 proceeds to Step 5403 when the command to perform the self-check process is received from the main controller 220. Or, in Step S402, each module controller 120 proceeds to Step S403 when the user operates the check switch 109 of the battery module 100.

In Step S403, the module controller 120 turns on the transistor 126 of the discharge circuit 127 so as to electrically close the discharge circuit 127 that includes the energy-consuming element 125 with respect to the battery cells 101. Accordingly, the discharge of the battery cells 101 in the battery modules 100 begins. In Step S404, the module controller 120 detects the voltage, current, and temperature of the battery cells 101 in discharge state. In Step S405, the module controller 120 continues to detect the voltage, current, and temperature of the battery cells 101 in the discharge state for a predetermined period of time.

Figure 13B:
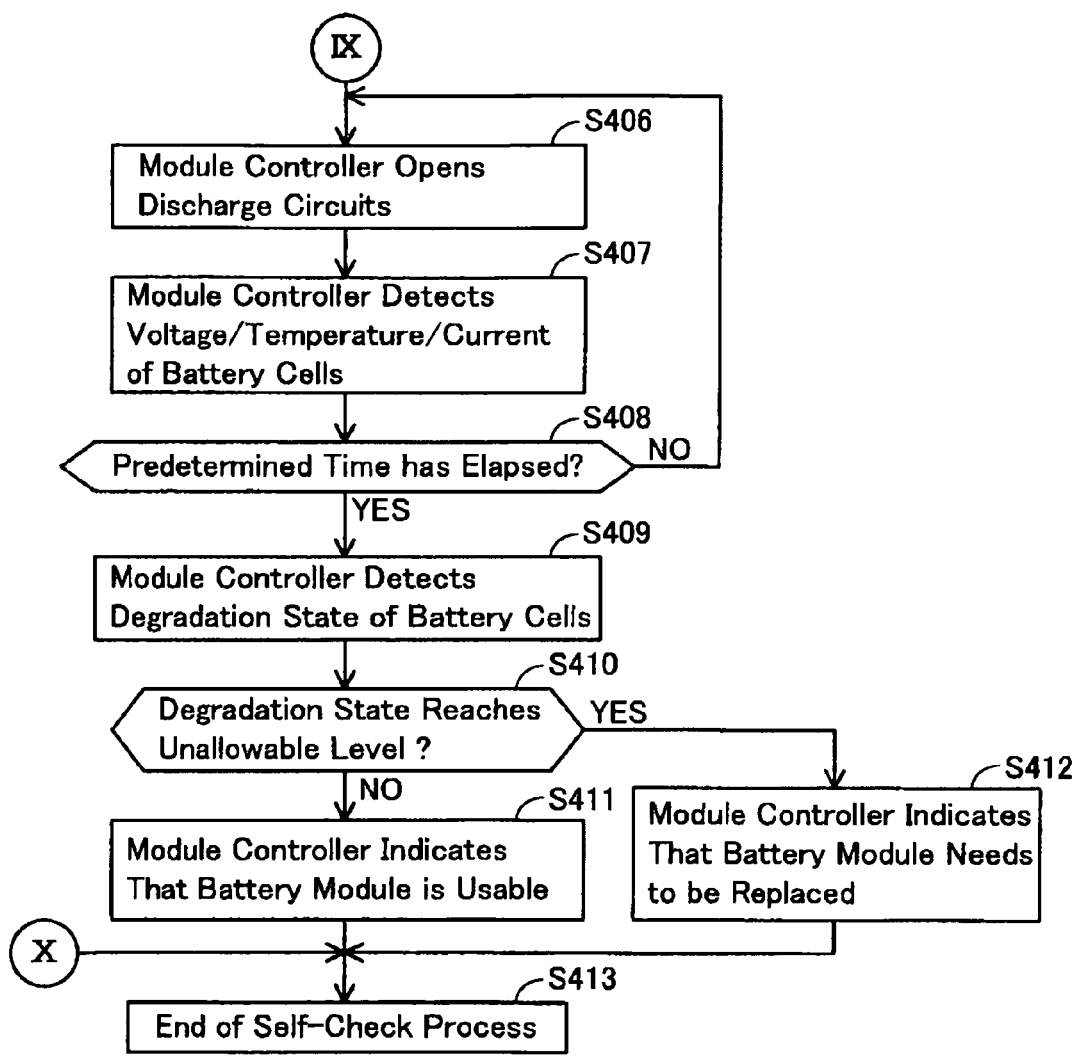

In Step S406 shown in FIG. 13B, the module controller 120 turns off the transistor 126 of the discharge circuit 127 so as to electrically open the discharge circuit 127 with respect to the battery cells 101. Accordingly, the discharge of the battery cells 101 is ended. In Step S407, the module controller 120 detects the voltage, current, and temperature of the battery cells 101 in non-discharge state. In Step S408, the module controller 120 continues to detect the voltage, current, and temperature of the battery cells 101 in the non-discharge state for a predetermined period of time.

In Step S409, the module controller 120 detects the internal resistance of each battery cell 101 based upon the detected voltage, current, and temperature. Then, the module controller 120 determines the degradation state of the battery cells 101 based upon the detected voltage and internal resistance of each battery cell 101. When there is no problem with the detected degradation state of the battery cells 101, then in Step S411, the module controller 120 uses the display light 110 to indicate that the battery module 101 is still usable. In contrast, when the detected degradation state reaches an unallowable level, then in Step S412, the module controller 120 indicates with the display light 110 that the battery module 100 need to be replaced. Accordingly, the self-check process of the battery modules 100 will be completed.

Note that the degradation state of the battery cells 101 can be accurately determined based upon the internal resistance of the battery cells 101. The internal resistance of the battery cells 101 corresponds to the voltage difference between the voltage of the battery cells 101 detected during discharge during Steps S403 to S405, and the voltage of the battery cells 101 detected during non-discharge during Steps S406 to S408. Thus, in the event that the voltage difference is equal to or greater than a predetermined value, it can be determined that the battery cells 101 can no longer be used because the internal resistance of the battery cells 101 is equal to or greater than a predetermined value. In addition, even in the event that a variation in the voltages between the battery cells is detected, and the voltage variation exceeds a predetermined value, it can be determined that the battery cells 101 can no longer be used. Here, because the internal resistance of the battery cells 101 changes in response to the temperature of the battery cells 101, the temperature of the battery cells 101 may be added when the internal resistance is to be calculated.

As described above, when the user is to replace a battery module 100, the self-check process of the battery modules 100 is automatically performed when the user opens the module cover 250. Then, the battery modules 100 that can no longer be used indicates that replacement is needed with the display light 110. Consequently, the user will not mistakenly believe that a battery module 100 needs to be replaced. In addition, the battery modules 100 can perform the self-check process even when they have been removed from the pack main body 200. Thus, the user can confirm whether the battery modules 100 that are to be used as replacements are capable of use prior to installing these battery modules 100 in the pack main body 200.

The discharge circuits 127 of the battery modules 100 are used with the self-check process of the battery modules 100. The discharge circuits 127 are also used in the balance discharge process described earlier. Thus, the discharge circuits 127 of the battery modules 100 are used in both the self-check process and the balance discharge process. By providing the discharge circuits 127 in the interior of the battery modules 100, and using the discharge circuits 127 in a plurality of processes, the construction of the internal circuits of the battery modules 100 and the pack main body 200 can be simplified.

(Embodiment 2)

Figure 14:
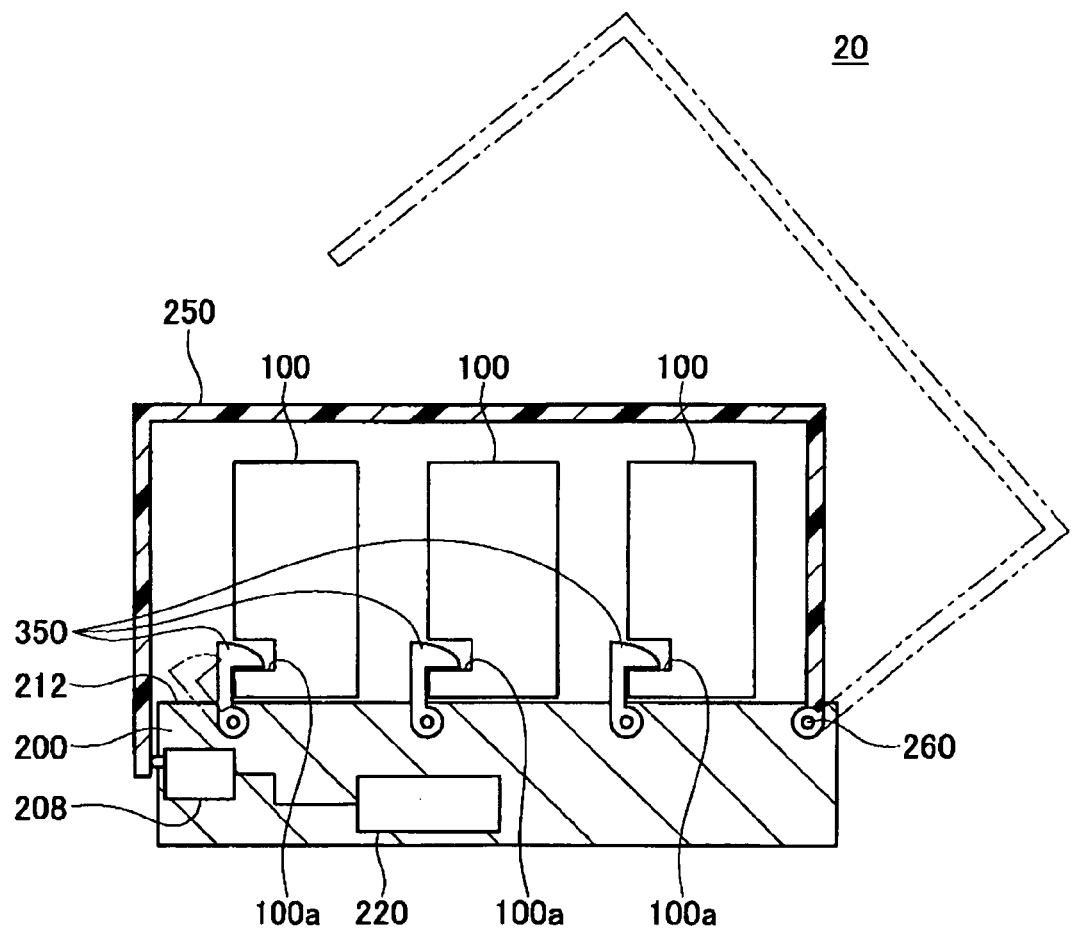
FIG. 14 shows an outline of the battery pack of Embodiment 2.

A battery pack 20 of Embodiment 2 will be described. FIG. 14 shows an outline of the structure of the battery pack 20 of Embodiment 2. As with the battery pack 10 of Embodiment 1, the battery pack 20 is capable of being recharged, and can supply that electric power to the electric power tool 400 (omitted in FIG. 14). The battery pack 20 of Embodiment 2 has the same construction as the battery pack 10 of Embodiment 1. In addition, the same reference numbers are associated with the same structural elements found in Embodiment 1.

As shown in FIG. 14, the battery pack 20 comprises three battery modules 100, and a pack main body 200. Each battery module 100 is equipped with battery cells 101 that are connected in series (omitted in FIG. 14). The plurality of battery modules is removable from the pack main body 200, and the pack main body 200 connects the plurality of installed battery modules 100 in series. In addition, the pack main body 200 can supply electric power from the battery modules 100 connected in series to the electric power tool 400.

The pack main body 200 has a module containing portion 212, a module cover 250 that closes the module containing portion 212, a module cover sensor 208 that detects whether the module cover 250 is open or closed, and a main controller 220 that is connected with the module cover sensor 208.

The module cover 250 is pivotably supported on the pack main body 200 around a shaft 260. The module cover 250 is a moveable member that can shift between a closed position which closes the module containing portion 212, and an open position that opens the module containing portion 250. The module cover 250 prohibits the installation and removal of the battery modules 100 with respect to the pack main body 200 when in the closed position, and permits the installation and removal of the battery modules 100 with respect to the pack main body 200 when in the open position. The module cover sensor 208 detects whether or not the module cover 250 is in the closed position, and outputs that detection result to the main controller 220. The main controller 220 can perform the various processes described in Embodiment 1, based upon the detection result of the module cover sensor 208.

The pack main body 200 further comprises three lock members 350. Each lock member 350 is pivotably supported by the pack main body 200, and can shift between a lock position that engages with a concave portion 100a of the battery module 100, and an unlocked position that is separated from the concave portion 100a of the battery module 100. The lock members 350 prevent the installation and removal of the battery modules 100 with respect to the pack main body 200 when in the lock position, and permit the installation and removal of the battery modules 100 with respect to the pack main body 200 when in the unlock position. Thus, as shown in FIG. 14, even if the installation and removal of the battery modules is permitted with the module cover 250 in the open position, the installation and removal of the battery modules 100 with respect to the pack main body 200 are prohibited so long as the installation and removal of the battery modules 100 is prohibited with the lock members 350 in the lock position.

As noted above, in addition to the module cover 250, the lock members 350 are added to the battery pack 20 of Embodiment 2. Both the module cover 250 and the lock members 350 are movable members that can shift between a first position that prohibits the installation and removal of the battery modules 100, and a second position that prohibits the installation and removal of the battery modules 100. More of these type of moveable members can be provided on the battery pack 20. In addition, instead of providing the module cover sensor 208 on the battery pack 20 of Embodiment 2, a sensor can also be provided that detects whether or not the lock members 350 are in the lock position. Even in this case, the battery pack 20 can perform various necessary processes prior to the user replacing the battery modules 100.

(Embodiment 3)

Figure 15:
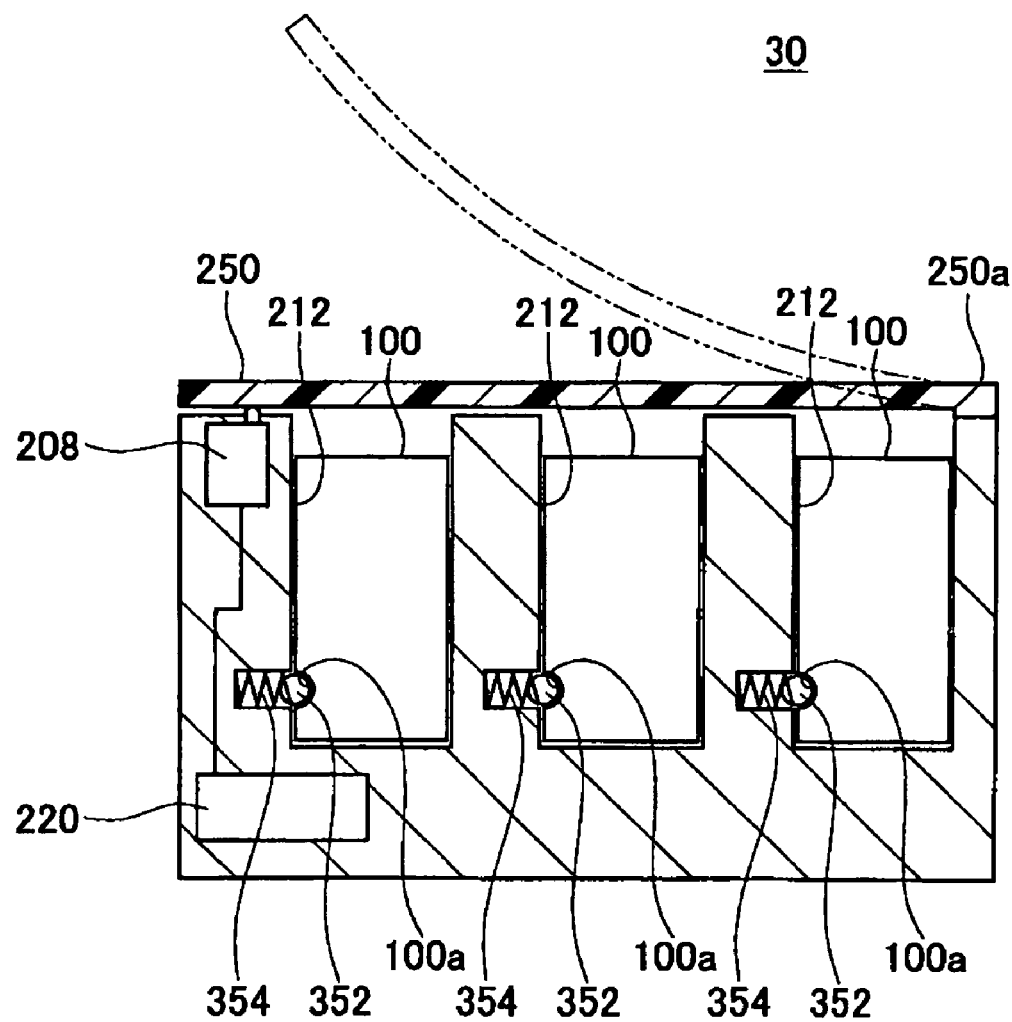
FIG. 15 shows an outline of the battery pack of Embodiment 3.

A battery pack 30 of Embodiment 3 will be described. FIG. 15 shows an outline of the structure of the battery pack 30 of Embodiment 3. As with the battery pack 10 of Embodiment 1, the battery pack 30 is capable of being recharged, and can supply that electric power to the electric power tool 400 (omitted in FIG. 15). The battery pack 30 of Embodiment 3 has the same construction as the battery pack 10 of Embodiment 1. In addition, the same reference numbers are associated with the same structural elements found in Embodiment 1.

As shown in FIG. 15, the battery pack 30 comprises three battery modules 100, and a pack main body 200. Each battery module 100 is equipped with battery cells 101 that are connected in series (omitted in FIG. 15). The plurality of battery modules is removable from the pack main body 200, and the pack main body 200 connects the plurality of installed battery modules 100 in series. In addition, the pack main body 200 can supply electric power from the battery modules 100 connected in series to the electric power tool 400.

The pack main body 200 has a module containing portion 212, a module cover 250 that closes the module containing portion 212, a module cover sensor 208 that detects whether the module cover 250 is open or closed, and a main controller 220 that is connected with the module cover sensor 208. The module containing portions 212 are compartments for each battery module 100.

The module cover 250 is a flat member formed from an elastic material, and can deform so as to bend. An edge portion 250a of the module cover 250 is fixed to the pack main body 200. The module cover can move from a closed position which closes the module containing portions 212, and an open position which opens the module containing portions 212, by elastically deforming. The module cover 250 prohibits the installation and removal of the battery modules 100 with respect to the pack main body 200 when in the closed position, and permits the installation and removal of the battery modules 100 with respect to the pack main body 200 when in the open position. Note that, as an alternative to the elastic deformation, the module cover 250 may plastically deform.

The module cover sensor 208 detects whether or not the module cover 250 is in the closed position, and outputs that detection result to the main controller 220. The main controller 220 can perform the various processes described in Embodiment 1, based upon the detection result of the module cover sensor 208.

The pack main body 200 further comprises three latch members 352. Each latch member 352 is urged toward a battery module 100 by a coil spring 354, and is capable of shifting between a latch position which engages with the concave portion 100a of a battery module 100, and an unlatch position that is separated from the concave portion 100a of a battery module 100. If the latch members 352 are maintained in the latch position, the installation and removal of the battery modules 100 with respect to the pack main body 200 are prohibited. However, because the coil spring 354 is not that strong, the latch members 352 passively shift to the unlatch position when the user moves the battery modules 100. The latch members 352 permit the installation and removal of the battery modules 100 with respect to the pack main body 200 by moving to the unlatch position.

With the battery pack 30, the latch member 352 must shift to the unlatch position when the battery modules 100 are installed or removed with respect to the pack main body 200. Because of that, with the battery pack 30 of Embodiment 3, it is also effective to provide a sensor that detects whether or not the latch members 352 are in the latch position instead of providing the module cover sensor 208. Even in this case, the replacement of a battery module 100 by a user can be reliably detected, and the battery pack 30 can automatically perform various necessary processes.

Specific embodiments of the present teachings are described above, but these embodiments merely illustrate some representative possibilities for utilizing the present teachings and do not restrict the claims thereof. The subject matter set forth in the claims includes variations and modifications of the specific examples set forth above.

The technical elements disclosed in the specification or the drawings may be utilized separately or in other combinations that are not expressly disclosed herein, but may be readily apparent to a person of ordinary skill in the art. Furthermore, the subject matter disclosed herein may be utilized to simultaneously achieve a plurality of objects or to only achieve one object, which object(s) may not be explicitly recited in the present disclosure.

What is claimed is:

1. A battery pack configured to supply electric power to an electric power tool, the battery pack comprising:
   a plurality of battery modules, each comprising at least one battery cell;
   a pack main body configured to: removably receive the plurality of battery modules, electrically connect the plurality of battery modules, and output electric power from the plurality of battery modules to the electric power tool;
   a movable member configured to: be movable to and from a first position with respect to the pack main body, and prohibit the plurality of battery modules from being attached to and removed from the pack main body when the movable member is at the first position;
   at least one sensor configured to detect whether the movable member is at the first position or not;
   at least one switch electrically connected in series with the at least one battery cell of the battery module; and
   a controller coupled with the at least one sensor and the at least one switch, and configured to turn off the at least one switch when detection by the at least one sensor indicates movement of the movable member from the first position.

2. The battery pack as in claim 1, wherein
   the at least one switch includes a first switch disposed on a wiring that conducts discharging current from the at least one battery cell, and
   the controller is configured to turn off the first switch for prohibiting the plurality of battery modules from being discharged by the electric power tool when the detection by the at least one sensor indicates movement of the movable member from the first position.

3. The battery pack as in claim 1, wherein
   the at least one switch includes a second switch disposed on a wiring that conducts charging current to the at least one battery cell of the battery module, and
   the controller is configured to turn off the second switch for prohibiting the plurality of battery modules from being charged by an external power supply when the detection by the at least one sensor indicates movement of the movable member from the first position.

4. The battery pack as in claim 1, wherein
the at least one switch includes a third switch disposed on a wiring that electrically connects the at least one battery cell of one battery module in series with the at least one battery cell of another battery module, and
the controller is configured to turn off the third switch for electrically disconnecting the plurality of battery modules attached to the pack main body when the detection by the at least one sensor indicates movement of the movable member from the first position.

5. The battery pack as in claim 1, wherein
the plurality of battery modules each comprises the at least one switch electrically connected in series with the at least one battery cell; and
the controller is configured to turn off the at least one switch of at least one of the plurality of battery modules when the detection by the at least one sensor indicates movement of the movable member from the first position.

6. The battery pack as in claim 5, wherein the controller is configured to turn on the at least one switch after the detection by the at least one sensor indicates movement of the movable member to the first position.

7. The battery pack as in claim 6, wherein the controller is configured to keep turning off the at least one switch for a predetermined delay time after the detection by the at least one sensor indicates the movement of the movable member to the first position.

8. The battery pack as in claim 1, wherein the controller is configured to perform a check process for checking a state of degradation of the at least one battery cell disposed in each of the plurality of battery modules when the detection by the at least one sensor indicates movement of the movable member from the first position.

9. The battery pack as in claim 8, wherein
the plurality of battery modules each comprises a detector configured to detect at least one of voltage and current of the at least one battery cell thereof and a discharging circuit configured to be electrically connected to and discharge the at least one battery cell thereof in accordance with an instruction from the controller, and
the controller is configured to use the detectors and the discharging circuits of the plurality of battery modules in the check process.

10. The battery pack as in claim 1, wherein the controller comprises a memory unit configured to memorize at least a part of the detection by the at least one sensor, and
the controller is configured to perform a balance process for charging or discharging at least one of the plurality of battery modules so as to equalize states of charge among the plurality of battery modules.

11. The battery pack as in claim 1, wherein the controller comprises a memory unit and is configured to:
memorize a first detection flag in the memory unit when the detection by the at least one sensor indicates movement of the movable member from the first position,
perform a balance process for charging or discharging at least one of the plurality of battery modules so as to equalize states of charge among the plurality of battery modules at a predetermined timing when the first detection flag is memorized in the memory unit, and
erase the first detection flag from the memory unit upon performing the balance process.

12. The battery pack as in claim 1, wherein the controller comprises a memory unit and is configured to:
memorize a first detection flag in the memory unit when the detection by the at least one sensor indicates movement of the movable member from the first position,
perform a balance process for charging or discharging at least one of the plurality of battery modules so as to equalize states of charge among the plurality of battery modules in a process of charging of the battery pack when the first detection flag is memorized in the memory unit, and
erase the first detection flag from the memory unit upon performing the balance process.

13. The battery pack as in claim 10, wherein
the plurality of battery modules each comprises a detector configured to detect at least one of voltage and current of at least one of the plurality of battery cells thereof, and a discharging circuit configured to electrically connect to and discharge the plurality of battery cells thereof in accordance with an instruction from the controller, and
the controller is configured to use the detector and the discharging circuit of the at least one of the plurality of battery modules in the balance process.

14. The battery pack as in claim 13, wherein the controller is configured to further perform a check processing for checking a state of degradation of the plurality of battery cells disposed in each of the plurality of battery modules with a use of the detectors and the discharging circuits of the plurality of the battery modules.

15. The battery pack that supplies electric power to an electric power tool, the battery pack comprising:
a plurality of battery modules, each comprising at least one battery cell;
a pack main body configured to: removably receive the plurality of battery modules, electrically connect the plurality of battery modules, and output electric power from the plurality of battery modules to the electric power tool;
an openable cover disposed on the pack main body and configured to at least partly screen the plurality of battery modules when the openable cover is closed;
at least one sensor configured to detect whether the openable cover is closed or not; and
at least one switch electrically connected in series with the at least one battery cell of the battery module; and
a controller coupled with the at least one sensor and the at least one switch, and configured to turn off the at least one switch when detection by the at least one sensor indicates that the openable cover is unclosed.

* * * * *